United States Patent
Konno et al.

(10) Patent No.: US 8,293,407 B2
(45) Date of Patent: *Oct. 23, 2012

(54) ELECTRODE BINDER, ELECTRODE, MEMBRANE-ELECTRODE ASSEMBLY AND POLYMER ELECTROLYTE FUEL CELL

(75) Inventors: Yoshiharu Konno, Tsukuba (JP); Toshihito Miyama, Tsukuba (JP); Hideyasu Nakajima, Tsukuba (JP); Masashi Kanoh, Tsukuba (JP)

(73) Assignee: Sekisui Chemical Co., Ltd., Osaka (JP)

( * ) Notice: Subject to any disclaimer, the term of this patent is extended or adjusted under 35 U.S.C. 154(b) by 441 days.

This patent is subject to a terminal disclaimer.

(21) Appl. No.: 12/531,241

(22) PCT Filed: Mar. 13, 2008

(86) PCT No.: PCT/JP2008/054622
§ 371 (c)(1),
(2), (4) Date: Sep. 14, 2009

(87) PCT Pub. No.: WO2008/114688
PCT Pub. Date: Sep. 25, 2008

(65) Prior Publication Data
US 2010/0092840 A1    Apr. 15, 2010

(30) Foreign Application Priority Data

Mar. 16, 2007 (JP) .................. 2007-069493
Jul. 25, 2007 (JP) .................. 2007-193697
Sep. 28, 2007 (JP) .................. 2007-255896

(51) Int. Cl.
*H01M 4/00* (2006.01)
*H01M 4/134* (2010.01)
*H01M 4/86* (2006.01)
*H01M 8/10* (2006.01)

(52) U.S. Cl. ............... 429/218.1; 429/232; 429/313; 429/314; 429/315; 429/316; 429/317; 429/400; 528/30; 528/33

(58) Field of Classification Search .............. 429/313, 429/314, 315, 316, 317, 400, 218.1, 232; 528/30, 33
See application file for complete search history.

(56) References Cited

U.S. PATENT DOCUMENTS
2001/0020084 A1    9/2001    Aoki et al.
(Continued)

FOREIGN PATENT DOCUMENTS
JP    2002-121218 A    4/2002
(Continued)

OTHER PUBLICATIONS

Chinese Office Action corresponding to Chinese Patent Application No. 200880004720.8, dated May 24, 2011.
(Continued)

*Primary Examiner* — Brian P Mruk
(74) *Attorney, Agent, or Firm* — Sughrue Mion, PLLC

(57) ABSTRACT

An electrode which can be used in a fuel cell having improved power generation performance and high durability, and a fuel cell having such an electrode, are provided. An electrode having catalyst layers arranged on both surfaces of an electrolyte membrane, wherein the electrode is characterized in that an electrode binder used for constituting the catalyst layers contains a cross-linked compound (X) having a silicon-oxygen bond, a polymer material (Y) containing an acid group, and an aqueous dispersion (Z) containing a thermoplastic resin.

13 Claims, 1 Drawing Sheet

U.S. PATENT DOCUMENTS

2004/0062970 A1* 4/2004 Nomura et al. ................. 429/33

FOREIGN PATENT DOCUMENTS

| JP | 2004-002114 A | 1/2004 |
| JP | 2005079059 A | 3/2005 |
| JP | 2005-120198 A | 5/2005 |
| JP | 3679104 B2 | 8/2005 |
| JP | 2006054176 A | 2/2006 |
| WO | 03/026051 A1 | 3/2003 |

OTHER PUBLICATIONS

International Preliminary Report on Patentability (Chapter I) dated Oct. 1, 2009 in corresponding International Patent Application No. PCT/JP2008/054622.

European Search Report corresponding to European Patent Application No. 08722026.5, dated Jul. 9, 2010.

Korean Office Action corresponding to Korean Patent Application No. 10-2009-7018896, dated Apr. 1, 2011.

* cited by examiner

ELECTRODE BINDER, ELECTRODE, MEMBRANE-ELECTRODE ASSEMBLY AND POLYMER ELECTROLYTE FUEL CELL

TECHNICAL FIELD

The present invention relates to an electrode binder, an electrode and a membrane-electrode assembly, which can be used in a fuel cell, and a polymer electrolyte fuel cell thereof.

BACKGROUND ART

Fuel cells are classified into a phosphoric acid one, a molten carbonate one, a solid oxide one, a polymer electrolyte one and the like based on types of electrolytes composing the fuel cells. Among them, with regard to the polymer electrolyte fuel cell (hereinafter, referred to as a "PEFC"), a device thereof is small and an output thereof is high in comparison with the fuel cells of the other modes. Accordingly, the PEFC is placed as a system that plays a dominant role in the next generation. The PEFC is expected to serve as a fuel cell for small-scale on-site power generation, for a power source of a movable body such as a vehicle, for a portable instrument, or for the like.

In a basic structure of the PEFC, gas diffusion electrodes on which a catalyst such as platinum is supported are arranged on both sides of a proton (hydrogen ion) conducting membrane, and a pair of separators having a structure to supply a fuel are arranged further on both outsides of the arranged gas diffusion electrodes. This basic structure is taken as a unit cell, and a plurality of the cells adjacent to one another are coupled to one another, whereby it becomes possible to take out a desired power. For example, when hydrogen is supplied as the fuel from one side (generally referred to as an anode or a fuel electrode) of such an assembly, a reaction of $H_2 \rightarrow 2H^+ + 2e^-$ occurs on the fuel electrode side by the catalyst, and protons and electrons are generated. Here, the protons are supplied to an opposite electrode (generally referred to as a cathode, an air electrode or an oxygen electrode) side through the electrolyte membrane (referred also to a proton conducting membrane) in contact with electrodes of the fuel electrode and air electrode sides. Moreover, the electrons are collected at the electrode on the fuel electrode side, are used as electricity, and are thereafter supplied to the air electrode side. Meanwhile, the air electrode (oxygen electrode) side receives air (oxygen) supplied thereto, the protons which have passed through the proton conducting membrane, and the electrons used as the electricity, and a reaction of $\frac{1}{2}O_2 + 2H^+ + 2e^- \rightarrow H_2O$ occurs in the presence of the catalyst.

As described above, chemical reactions under the fuel cell operation occur on interface portions between the proton conducting membrane and the gas diffusion electrodes on which the catalyst is supported, and accordingly, interface structures of the membrane, the electrode and the catalyst largely affect performance of the fuel cell, which is such as power generation efficiency. The assembly of the proton conducting membrane and the gas diffusion electrodes is generally referred to as a membrane-electrode assembly (MEA), and has become one of major technology development fields of the fuel cell.

In the MEA, it is necessary that the membrane, the catalyst and the electrodes are coupled to one another while having appropriate interfaces thereamong. Specifically, when the fuel electrode side is taken as an example, it is necessary that the hydrogen or the like as the fuel can contact a catalyst surface, and that the protons and the electrons, which are generated from the hydrogen, are efficiently delivered individually to the membrane and the electrodes. At present, the one used most normally as the proton conducting membrane for the fuel cell is sulfonated fluorine resin (representative example: trade name "Nafion (registered trademark)" made by DuPont Corporation) having thermoplasticity.

However, the sulfonated fluorine resin having the thermoplasticity has a problem of being short of heat resistance at the time of operating the polymer electrolyte fuel cell. Specifically, the sulfonated fluorine resin exerts proton conductivity in such a manner that ion channels are formed therein by coagulation of sulfone groups; however, the sulfonated fluorine resin has a defect of being plastically deformed at a specific temperature or more because of having the thermoplasticity, resulting in the breakage of an ion channel structure. Therefore, in the sulfonated fluorine resin, the plastic deformation occurs in a short time at approximately 130° C. of a glass transition temperature (Tg) or more, and gradually occurs even in a temperature range from 100 to 130° C., and ion conductivity is lowered, whereby it is difficult to maintain high fuel barrier property.

Moreover, in recent years, there have also been examined fuel cells, each using fuel such as alcohol, ether and hydrocarbon, which is other than the hydrogen, as the fuel of the fuel cell, and taking out the protons and the electrons from the fuel other than the hydrogen by the catalyst. A representative example of the fuel cells as described above is a direct methanol fuel cell (DMFC) using methanol (in usual, used as an aqueous solution) as the fuel. The DMFC does not require an external reformer, and easily handles the fuel, and accordingly, is expected most as a small and portable power supply among various types of the fuel cells.

However, the above-mentioned sulfonated fluorine resin membrane has extremely high affinity with the methanol, and accordingly, has had a serious problem that the sulfonated fluorine resin concerned largely swells by absorbing the methanol, causes a so-called methanol crossover in which the methanol permeates the swelled proton conducting membrane to then leak out to the cathode side, resulting in that the output of the fuel cell is largely lowered.

Meanwhile, also with regard to electrolyte membranes for the fuel cell, which are made of other than the sulfonated fluorine resin, various types of membranes and the like, which are of hydrocarbon series, inorganic series and the like, are developed actively. For example, an organic silicon compound is composed of a silicon-oxygen bond having strong bonding energy, and accordingly, has high chemical stability, high heat resistance and high oxidation resistance, and can impart many exceptional properties depending on a composition thereof. Therefore, the organic silicon compound is used in every industrial field such as electrics, electronics, business machines, construction, food, health care, textile, plastic, paper, pulp, paint and rubber.

A proton conducting membrane is disclosed, which uses this organic silicon compound and has a cross-linked structure composed of the silicon-oxygen bond (for example, refer to Patent Literature 1). Even in the case of being exposed to a high-temperature and high-humidity environment under strong acidic conditions (where the protons are present) as in the proton conducting membrane, the cross-linked structure composed of the silicon-oxygen bond is relatively stable, and can be suitably used as a cross-linked structure in an inside of the fuel cell membrane. Moreover, even in the case of using the alcohol such as the methanol, the swelling is suppressed to be small by the silicon-oxygen cross-linked structure, and the methanol crossover can be expected to be reduced.

On the other hand, a solution of conventional sulfonated fluorine resin with thermoplastisity dissolved in a polar solvent such as alcohol as an electrode binder, and a paste (catalyst ink) of the electrode binder mixed with an electron conductive material such as carbon supported with catalyst such as platinum is coated on a gas diffusion layer such as a carbon paper, and dried; the resultant electrode has generally been used. Here, the electrode binder is a liquid to adjust a catalyst ink so as to be liquid-like or paste-like by mixing with an electron conductive material supported with catalyst. In order to form an electrode, a catalyst ink is dried and solidified, and a layer, called a catalyst layer, containing a catalyst supported electron conductive material and an electrode binder solidified material (binding component), is formed.

Here, as the electrode binder, the following three points are mainly required; 1) High affinity for electrode constituent components. 2) High proton conductivity after the electrode catalyst layer is formed by drying and solidifying. 3) After solidifying, a strength not destroyed by a variation of temperature environment or a pressure due to a flow of gas or liquid, is added to the catalyst layer, and its strength is maintained for a long time.

In case of using the electrode composed of the electrode binder solidified material of the sulfonated fluorine resin described above, a softening due to heat and a swelling due to methanol absorption of the sulfonated fluorine resin are large, and accordingly in the operation under high temperatures, and/or in case of using a fuel of a relatively high methanol concentration, there have been problems, for example, a sufficient power generation performance can not be obtained or durability is deteriorated.

Consequently, when a catalyst layer of the electrode is fabricated by using a cross-linked compound having a silicon-oxygen bond and an electrode binder containing a polymer material having an acid group, a softening due to heat and a swelling due to methanol are inhibited and a high power generation performance can be expected to be realized.

However, when even higher power generation performance is required to be obtained, as an acid component, whether a material has a specific property inherent in an inorganic material or inherent in an organic material, when the material has a large molecular weight as well as an almost single molecular weight distribution, then, since an acid component is difficult to enter inside of a secondary agglomerate (agglomerate) of catalyst supported carbon composing the electrode, a utilization efficiency of catalyst such as platinum and the like is insufficient, whereby problems such as an output decrease and the like have been produced.

Furthermore, in case of fabricating MEA using the proton conductive membrane having the silicon-oxygen cross-linked structure described above and the electrode of sulfonated fluorine resin used as a electrode binder solidified material (binding component), since their constituent components are largely different with each other, there have been the case where adhesion strength between the membrane and the electrode becomes weak (for example, refer to Patent Literature 2).

Even in this case, when an electrode binder solidified material composing the electrode is formed by using the electrode binder containing the cross-linked compound having the silicon-oxygen bond and the polymer material having an acid group, which are described above, MEA with high membrane-electrode adhesion strength as well as with high durability can be expected to be obtained.

Moreover, in the proton conducting membrane having the silicon-oxygen cross-linked structure, intermolecular force of a silicon-carbon bond in the membrane to the peripheries thereof is somewhat weaker than that of the silicon-oxygen bond, and impact resistance of this proton conducting membrane to an external pressure derived from a humidity change, sudden swelling and the like is sometimes low. Therefore, for example, in the case of using a certain type of the organic silicon compound as a material of the membrane-electrode assembly for which high proton conductivity under high and low temperature conditions is required, performance deterioration in the proton conductivity and the fuel barrier property, which is caused by temperature variations, sometimes occurs. In this connection, an MEA using a membrane having high impact resistance while having the cross-linked structure has been required.

(Cited Literatures)

Patent Literature 1: Japanese Patent No. 3679104

Patent Literature 2: International Publication WO03/026051

DISCLOSURE OF THE INVENTION

Problems to be Solved by the Invention

An object of the present invention is to provide an electrode having improved power generation performance and high durability, and a fuel cell having such an electrode with the same.

Means for Solving the Problems

In accordance with an aspect of the present invention, an electrode binder configured to form a catalyst layer in an electrode having catalyst layers arranged on both surfaces of an electrolyte membrane, wherein the electrode binder has a cross-linked compound (X) having a silicon-oxygen bond, a polymer material (Y) containing an acid group and an aqueous dispersion (Z) containing a thermoplastic resin, is provided.

Moreover, the polymer material (Y) is suitable to be the one composed of a polymer material (Y1) containing an acid group with a molecular weight of 1,000 to 300.000 and a polymer material (Y2) containing an acid group with a molecular weight of 300,000 to 10,000,000. A polymer material (Y1) containing an acid group with a molecular weight of 5,000 to 100,000 and a polymer material (Y2) containing an acid group with a molecular weight of 500,000 to 5,000,000 are more preferable.

Note that, the polymer material (Y) is suitable to be a composite of a monomer (V) containing an acid group and a monomer (W) not containing an acid group and containing silicon. Here, a molar ratio of the monomer (V) to the monomer (W) not containing the acid group and containing the silicon, that is, V:W is desirable to be 99:1 to 50:50.

Moreover, the polymer material (Y) is also suitable to be the one containing an acid group-containing polymer obtained by polymerizing a monomer having a polymerizable unsaturated double bond.

Moreover, as for an aqueous dispersion (Z) containing a thermoplastic resin, a fluorine resin dispersion is desirable to be contained.

In accordance with an aspect of the present invention, an electrode having a catalyst layer formed of a catalyst ink having the electrode binder described before and an electron conductive material supported with a catalyst, is provided. Moreover, a membrane-electrode assembly composed of an electrolyte membrane and the electrodes described before arranged on both surfaces of the electrolyte membrane, is provided.

Preferably, the electrolyte membrane is an electrolyte membrane including: an acid group-containing structure (H);

and a silicon-oxygen bonding structure (A) containing a cross-linked structure by a silicon-oxygen bond, wherein the silicon-oxygen bonding structure (A) is a structure represented by a following general formula (I):

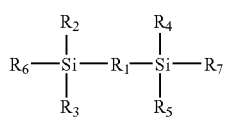

(I)

(wherein $R_1$ is a chain hydrocarbon group containable a substituent with a carbon number of 1 to 50 and/or a heteroatom, or is an oxygen atom, $R_2$, $R_3$, $R_4$, $R_5$, $R_6$ and $R_7$ are any of hydrogen atoms, methyl groups, ethyl groups, propyl groups, butyl groups, phenyl groups, methoxy groups, ethoxy groups, propoxy groups, butoxy groups, hydroxyl groups and O—Si—, and may be the same or different from one another, at least one of $R_1$ to $R_7$ contains an oxygen atom, at least one of $R_2$, $R_3$ and $R_6$ is O—Si concerned with the cross-link, and at least one of $R_4$, $R_5$ and $R_7$ is O—Si concerned with the cross-link.)

Moreover, the electrolyte membrane may be an electrolyte membrane, in which the silicon-oxygen bonding structure (A) containing the cross-linked structure by the silicon-oxygen bond and an acid group-containing structure (B) that is covalently bonded to a silane compound and has an acid group are coupled to each other by the silicon-oxygen bond, wherein the silicon-oxygen bonding structure (A) is a structure represented by the following general formula (I):

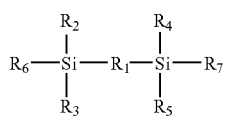

(I)

(wherein $R_1$ is a chain hydrocarbon group containable a substituent with a carbon number of 1 to 50 and/or a heteroatom, or is an oxygen atom, $R_2$, $R_3$, $R_4$, $R_5$, $R_6$ and $R_7$ are any of hydrogen atoms, methyl groups, ethyl groups, propyl groups, butyl groups, phenyl groups, methoxy groups, ethoxy groups, propoxy groups, butoxy groups, hydroxyl groups and O—Si—, and may be the same or different from one another, at least one of $R_1$ to $R_7$ contains an oxygen atom, at least one of $R_2$, $R_3$ and $R_6$ is O—Si concerned with the cross-link, and at least one of $R_4$, $R_5$ and $R_7$ is O—Si concerned with the cross-link.)

Moreover, the electrolyte membrane may be an electrolyte membrane, in which the silicon-oxygen bonding structure (A) containing the cross-linked structure by the silicon-oxygen bond and the acid group-containing structure (B) that is covalently bonded to the silane compound and has the acid group are coupled to each other by the silicon-oxygen bond, wherein the silicon-oxygen bonding structure (A) is a structure represented by the following general formula (I), and a structure in which a silane compound (α) having the polymerizable unsaturated double bond and an acid group-containing compound (β) having the acid group and the polymerizable unsaturated double bond are covalently bonded to each other may be contained in the acid group-containing structure (B).

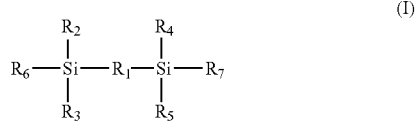

(I)

(wherein $R_1$ is a chain hydrocarbon group containable a substituent with a carbon number of 1 to 50 and/or a heteroatom, or is an oxygen atom, $R_2$, $R_3$, $R_4$, $R_5$, $R_6$ and $R_7$ are any of hydrogen atoms, methyl groups, ethyl groups, propyl groups, butyl groups, phenyl groups, methoxy groups, ethoxy groups, propoxy groups, butoxy groups, hydroxyl groups and O—Si—, and may be the same or different from one another, at least one of $R_1$ to $R_7$ contains an oxygen atom, at least one of $R_2$, $R_3$ and $R_7$ is O—Si concerned with the cross-link, and at least one of $R_4$, $R_5$ and $R_7$ is O—Si concerned with the cross-link.)

In accordance with another aspect of the present invention, a polymer electrolyte fuel cell composed by using the above-mentioned membrane-electrode assembly is provided. For example, by arranging a pair of separators which serve as passages of fuel and air on outsides of a membrane-electrode assembly, a polymer electrolyte fuel cell is formed.

Moreover, in accordance with another aspect of the present invention, provided is a polymer electrolyte fuel cell, in which the above-mentioned membrane-electrode assembly is taken as a unit cell, the pair of separators which serve as the passages of the fuel and the air are arranged on outsides of the unit cell, and a plurality of the unit cells adjacent to one another are coupled to one another.

Note that, in the specification, although the case where the electrode of the present invention is utilized for a gas diffusion electrode for a fuel cell is explained as an example, for example, the electrode of the present invention can also be used in an electrolyzation on ion-exchange membrane method expected as an energy saving process in the manufacturing process of chlorine and caustic soda by electrolyzation of the salt.

THE EFFECT OF THE INVENTION

According to the present invention, an electrode having improved power generation performance and high durability, and a fuel cell having such an electrode with the same, are provided.

BEST MODE FOR CARRYING OUT THE INVENTION

Figure 1:
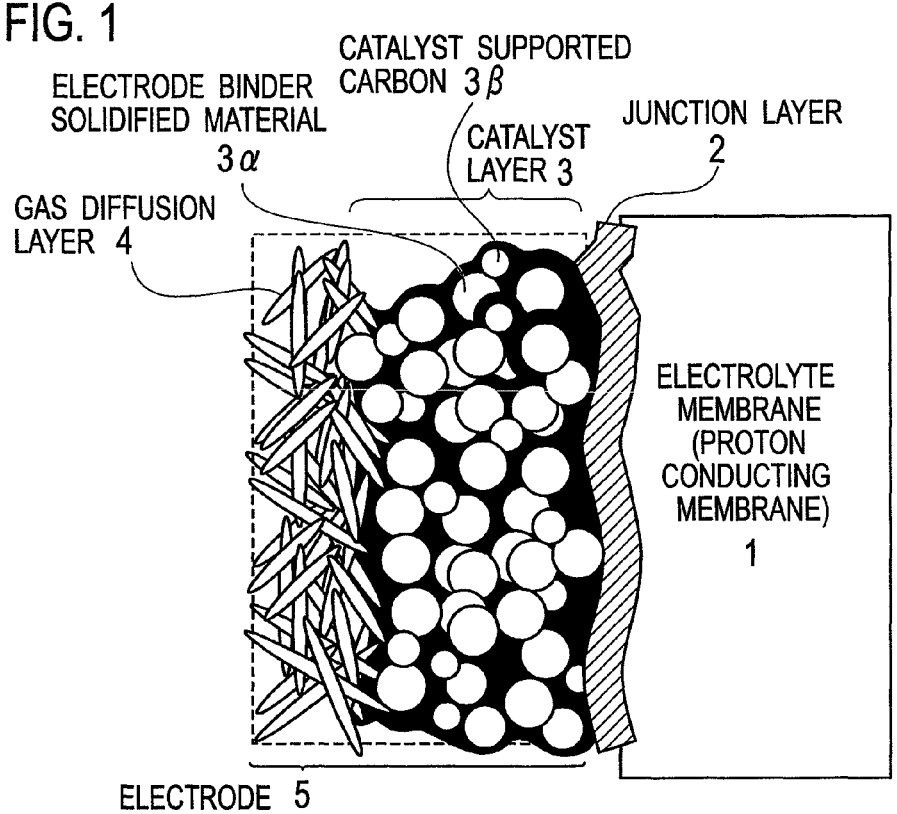
FIG. 1 is a schematic view showing a membrane-electrode assembly according to an embodiment of the present invention. Reference numerals in FIG. 1 denote as follows: 1 for an electrolyte membrane (a proton conducting membrane); 2 for a junction layer; 3 for a catalyst layer; 4 for a gas diffusion layer; 5 for an electrode; 3 a for an electrode binder solidified material; 3β for a catalyst supported carbon.

Next, a description will be made of an embodiment of the present invention with reference to the drawing. In the following description with reference to the drawing, the same or similar reference numerals are assigned to the same or similar portions. However, the drawing is schematic, and it should be noted that a ratio of the respective dimensions, and the like are different from that of the actual ones. Hence, specific dimensions and the like should be determined from taking the following description into consideration. Moreover, it is a matter of course that portions different in dimensional relationship and ratio are also included among the drawings.

<Electrode>

FIG. 1 is a schematic view showing a membrane-electrode assembly using the electrode according to the embodiment of the present invention, in FIG. 1, 5 is an electrode. The electrodes 5 are arranged on both surfaces of an electrolyte membrane (a proton conducting membrane) 1 (note that, only one side is shown in FIG. 1). Hereinafter, as an example of the electrolyte membrane, the explanation is done by using the proton conducting membrane. The electrode 5 is composed of a catalyst layer 3 situated in the proton conducting membrane 1 side and a gas diffusion layer 4 contacting with it. Hereinafter, these constituent elements are explained.

1. Catalyst Layer

As shown in FIG. 1, the catalyst layer 3 has a catalyst supported carbon 3β and an electrode binder solidified material 3α.

1-1. Catalyst Supported Carbon

The Catalyst supported carbon 3β is the one consisting of carbon fine particles supported with catalyst such as platinum. Since the reaction is accelerated more with a catalyst having larger surface area, it is desirable to use many particles with their diameters as small as possible. In the field of a fuel cell, although platinum catalyst and platinum-ruthenium alloy catalyst are normally used, catalysts are not limited to them. Since a catalyst with minimal diameter is difficult to handle, the catalyst is supported on carbon fine particles. Note that, although the case using carbon is explained in FIG. 1, instead of carbon, plate-like matters, particles and porous bodies of an electron conductive material such as metal, may be used. As for the electron conductive material, the one conducting electron and being able to be supported with catalyst is used without any particular limitation.

1-2. Electrode Binder and Electrode Binder Solidified Material

The electron binder solidified material 3α is formed from an electrode binder composed of a cross-linkable compound (X) having a silicon-oxygen bond, a polymer material (Y) containing an acid group and an aqueous dispersion (Z) containing a thermoplastic resin, as components. Specifically, when a catalyst layer is formed by drying and solidifying a catalyst ink containing a catalyst supported carbon and an electrode binder, these components exist in the catalyst layer as an electrode binder solidified material.

Here, the electrode binder is a liquid to adjust a catalyst ink so as to be liquid-like and paste-like, by mixing with an electron conductive material such as a catalyst supported carbon. As for the electrode binder, the following three points are mainly required. 1) High affinity for electrode constituent components. 2) High proton conductivity after the electrode catalyst layer is formed by drying and solidifying. 3) After solidifying, a strength not destroyed by a variation of temperature environment or a pressure due to a flow of gas or liquid, is added to the catalyst layer, and its strength is maintained for a long time.

The electrode binder of the present invention satisfies the above requirements, since it contains a cross-linked compound (X) having a silicon-oxygen bond, a polymer material (Y) containing an acid group and an aqueous dispersion (Z) containing a thermoplastic resin to be described later, as a result, power generation performance is improved, and the electrode with high durability and the fuel cell with the same are realized.

As for the form using the electrode binder, the embodiment of a catalyst ink formed by mixing an electrode binder of a solution containing each component of (X), (Y) and (Z) described above with a catalyst supported electron conductive material and the like is mentioned. Moreover, as for another embodiment, by preparing three solutions, a solution containing (X), a solution containing (Y), and a solution containing (Z), and by mixing them with a catalyst supported electron conductive material, a catalyst ink may be formed. In this case, an electrode binder containing (X), (Y), and (Z) exists in the catalyst ink. Note that, for example, a catalyst ink may be produced by two solutions of a solution containing (X) and (Y), and a solution containing (Z), accordingly, the embodiment for use is not particularly limited, and in a catalyst ink, it is enough to be an electrode binder having (X), (Y), and (Z).

1-2. (1) Cross-Linked Compound (X) Having Silicon-Oxygen Bond

The cross-linked compound (X) having the silicon-oxygen bond is heated under the presence of water and a catalyst, or is heated after being neutralized by acid, and thereby forms a three-dimensional cross-linked structure made by the silicon-oxygen bond. Accordingly, the cross-linked compound (X) can maintain a relatively stable shape even in the case of being exposed to a high-temperature and high-humidity environment under strong acidic conditions and in the case of using alcohol such as methanol as a fuel.

What can be preferably used as the cross-linked compound (X) described above is, for example, 1,2-bis(triethoxysilyl)ethane, 1,6-bis(trimethoxysilyl)hexane, 1,9-bis(triethoxysilyl)nonane, 1,8-bis(triethoxysilyl)octane, 1,8-bis(diethoxymethylsilyl)octane, 1,4-bis(trimethoxysilylethyl)benzene, 1,4-bis(triethoxysilylethyl)benzene, 1,8-bis(methyldiethoxysilyl)octane, alkoxysilanes such as tetramethoxysilane, tetraethoxysilane, tetraisopropoxysilane, tetrabutoxysilane, methyltrimethoxysilane, phenyltrimethoxysilane, phenyltriethoxysilane, dimethyldimethoxysilane, phenylmethyldimethoxysilane, ethyltrimethoxysilane, n-propyltrimethoxysilane, i-propyltrimethoxysilane and n-buthyltrimethoxysilane, silica, silica compounds such as potassium silicate and sodium silicate, and the like.

As the silica and/or the silicate, suitably can be used: the one in which the potassium silicate or the sodium silicate is neutralized by the acid; and the one from which metal ions are removed in such a manner that the matter concerned is transmitted through an ion exchange resin. Moreover, alkoxy titanium, alkoxy aluminum, phosphoric acid and/or phosphate, tungstic acid and the like, which can form the cross-linked points with the alkoxysilane or the silica and/or the silicate, may be further allowed to coexist with the polymer material (Y) and the hydrophilic resin (Z).

1-2. (2) Polymer Material (Y) Containing Acid Group

The polymer material (Y) containing the acid group is a polymer material that contains the acid group such as a sulfonic acid group (sulfo group), a carboxylic acid group (carboxyl group), a phosphoric acid group, a phosphonic acid group, and a phosphinic acid group. As the polymer material (Y), for example, mentioned are polymers obtained by polymerizing monomers such as vinyl sulfonic acid, allyl sulfonic acid, 2-acrylamide-2-methylpropane sulfonic acid, styrene sulfonic acid, 2-(methacryloyloxy)ethylsulfonic acid, 3-sulfopropyl methacrylate, 4,4'-diaminostilbenzene-2,2'-disulfonic acid, itaconic acid bis-(3-sulfopropyl), acrylic acid and methacrylic acid, polymers obtained by polymerizing vinyl phosphoric acid, allyl phosphoric acid and the like, and polyphosphoric acid. Moreover, if plural types of these monomers are copolymerized, then polymer materials which have a plurality of different acid groups in one molecule are obtained, and these can also be suitably used as the polymer material (Y). As these polymer materials, for example, mentioned are a vinyl sulfonic acid-acrylic acid copolymer, a 2-acrylamide-2-methylpropane sulfonic acid-acrylic acid copolymer, a 2-acrylamide-2-methylpropane sulfonic acid-vinyl phosphoric acid copolymer, and the like.

Moreover, the polymer material (Y) may further contain a monomer unit that has a functional group capable of being bonded to the monomer that forms the polymer material (Y) and does not contain the acid group, or may further contain a cross-linking agent that has a plurality of functional groups capable of being bonded to the polymer material (Y) or the monomer that forms the polymer material (Y). For example, methyl(metha)acrylate, ethyl(metha)acrylate, (metha)acrylamide, styrene and the like, and N,N'-methylene bis(acrylamide), neopentyl glycol diacrylate, 1,4-bis(acryloyloxy)butane, 1,3-bis(methacryloyloxy)-2-propanol, trimethylolpropane triacrylate, trimethyloipropane trimethacrylate, 1-(acryloyloxy)-3-(methacryloyloxy)-2-propanol, divinylbenzene, 3-(methacryloylamino)propyl trimethyl ammonium chloride, vinyl methacrylate and the like can be suitably used.

Furthermore, the polymer material (Y) may further contain a hydrophilic group in addition to the acid group. Here, as the hydrophilic group, mentioned are a hydroxyl group, an amino group, an amide group, an oxo group, a carbonyl group, a formyl group, a nitro group, a mercapto group and the like. The hydroxyl group, the amino group and the amide group are used more suitably. As the polymer material that contains the acid group and the hydrophilic group, for example, mentioned are a vinyl sulfonic acid-vinyl alcohol copolymer, a 2-acrylamide-2-methylpropane sulfonic acid-vinyl alcohol copolymer and the like. As described above, the polymer material (Y) containing the acid group further contains the hydrophilic group, whereby the bonding force of the catalyst supported carbon is enhanced, and the water resistance and polar solvent resistance of the electrode are enhanced.

Note that the polymer material (Y) described above may be a composite of a monomer (V) containing the acid group and a monomer (W) not containing the acid group and containing the silicon. What can be suitably used as the monomer (V) containing the acid group is the vinyl sulfonic acid, the allyl sulfonic acid, the 2-acrylamide-2-methylpropane sulfonic acid, the styrene sulfonic acid, the 2-(methacryloyloxy)ethylsulfonic acid, the 3-sulfopropyl methacrylate, the 4,4'-diaminostilbenzene-2,2'-disulfonic acid, the itaconic acid bis-(3-sulfopropyl) and the like. What can be suitably used as the monomer that does not contain the acid group but contains the silicon is 3-(trimethoxysilyl)propyl acrylate, 3-(methyldimethoxysilyl)propyl acrylate, 3-(triethoxysilyl)propyl acrylate, 3-(methyldiethoxysilyl)propyl acrylate, trimethoxy vinyl silane, triethoxy vinyl silane, 3-(trimethoxysilyl)propyl methacrylate, 3-(methyldimethoxysilyl)propyl methacrylate, 3-(triethoxysilyl)propyl methacrylate, 3-(methyldiethoxysilyl)propyl methacrylate, p-styryltrimethoxysilane, p-styryltriethoxysilane, and the like. In this case, a molar ratio of the monomer (V) to the monomer (W) is preferably 99:1 to 50:50.

With such a configuration, the silicon-oxygen cross-linked structure can also be imparted to the polymer material (Y) itself, the dissolution and the swelling, which are caused by the methanol and the like, are prevented, and the high oxygen concentration is realized, and as a result, the fuel cell in which the output is high can be provided.

The compounds as described above are available at a relatively low price, and types thereof are also abundant. Moreover, the compounds cause a reaction of the polymerizable unsaturated double bond relatively easily, and accordingly, are easy to control, and from the compounds, a target structure can be obtained by a simple polymerization control device. Accordingly, the compounds can be suitably used.

The polymer material (Y) described above is preferable to be composed of a polymer material (Y1) containing an acid group with an weight-average molecular weight of 1,000 to 300,000 and a polymer material (Y2) containing an acid group with an weight-average molecular weight of 300,000 to 10,000,000. More preferably, the weight-average molecular weight of the polymer material (Y1) is 5,000 to 100,000, and that of the polymer material (Y2) is 500,000 to 5,000,000. Here, the polymer material (Y1) produces an improved output by taking effectively advantage of catalyst, since the polymer material (Y1) enters inside a secondary agglomerate (agglomerate) of catalyst supported carbon supported with catalyst. Moreover, by the presence of polymer material (Y2), a stable power generation performance is preserved even under relatively high temperature and high methanol concentration.

Note that, in the claims and the specification, the "molecular weight" of polymer shows an weight average molecular weight in terms of the standard polyethylene glycol weight measured with Gel Permeation Chromatography (GPC).

Here, plural types of the polymer materials (Y) described above may be used. At this time, in addition to the above-mentioned polymers, an acid group-containing polymer material (Y) and/or an electrolyte material, which have the proton conductivity and are known in the technical field concerned, can also be used. These materials can be introduced mainly in order to enhance the proton conductivity.

For example, electrolyte materials as below are mentioned.

a) A composite compound composed of: an organic compound created by neutralizing at least one salt of silicic acid, tungstic acid, molybdic acid and stannic acid by acid in a raw material solution in which organic compounds containing organic polymers having the hydroxyl groups coexist, or neutralizing zirconium halide or zirconium oxyhalide by alkali therein, followed by removal of a solvent; at least one inorganic compound among a silicate compound, a tungstate compound, a molybdate compound, a stannate compound and a zirconate compound; and water.

b) As an aromatic polymer compound having the proton conductivity, for example, mentioned are: those in which acid groups such as the sulfonic acid group (sulfo group), the carboxylic acid group (carboxyl group), the phosphoric acid group, the phosphoric acid group, and the phosphoric acid group are introduced into polyetherketone, polyetheretherketone, polysulfone, polyethersu fone, polyetherethersulfone, poly(arylene ether), polyimide, polyphenylene, poly((4-phenoxybenzoyl)-1,4-phenylene), polyphenylene sulfide, polyphenylquinoxsalen and the like; sulfoarylated polybenzimidazole; sulfoalkylated polybenzimidazole; phosphoalkylated polybenzimidazole; phosphonated poly(phenylene ether); and the like.

c) A polymer in which the above-mentioned acid group is introduced into a block copolymer or a graft copolymer, which contains, as components, a polymer block containing, as a main repeating unit, an aromatic vinyl compound such as 4-tert-butylstyrene, a polymer block composed of styrene or α-methylstyrene, and a polymer block composed of conjugate diene.

d) A proton conducting material containing the above-mentioned acid group, and an aromatic polymer compound in which atoms in at least a part of aromatic units are substituted by fluorine atoms, wherein the aromatic polymer compound is polybenzoxazole (PBO), polybenzothiazole (PBT), polybenzoimidazole (PBI), polysulfone (PSU), polyethersulfone (PES), polyetherethersulfone (PEES), polyarylethersulfone (PAS), polyphenylenesulfone (PPSU), polyphenylene ether (PPE), denatured polyphenylene ether, polyphenylene sulfoxide (PPSO), polyphenylene sulfide (PPS), polyphenylene sulfide sulfone (PPS/SO2), polyparaphenylene (PPP), polyetheretherketone (PEEK), polyetherketoneketone (PEKK), polyimide (PI), polystyrene (PSt), syndiotactic polystyrene (s-PSt), and derivatives of these compounds, and copolymers of these compounds.

e) A polymer composition obtained by copolymerizing a monomer having the above-mentioned acid group and a monomer having a basic group, wherein the monomer having the acid group is acrylamide methyl propane sulfonic acid, the styrene sulfonic acid, the vinyl sulfonic acid, (meta)aryl sulfonic acid, acidphosphoxyethyl methacrylate, (metha) acrylic acid, maleic acid anhydride, and fumaric acid, and the monomer having the basic group is acrylamide, arylamine, vinyl pyrrolidone, vinyl imidazole, N-propylacrylamide, N-butylacrylamide, N-vinylformamide, vinyl pyridine, and dimethylaminoethyl(metha)acrylate.

f) Fullerenated polymer sulfonic acid composed in such a manner that polymers having the sulfonic acid group in aromatic rings are cross-linked together while interposing fullerene nuclei thereamong. For example, mentioned are polymers obtained by putting polymers such as polystyrene, polysulfone, polyvinylcarbazole and polycarbonate into fullerenes, followed by sulfonation.

1-2. (3) Aqueous Dispersion (Z) Containing Thermoplastic Resin

An aqueous dispersion (Z) containing a thermoplastic resin induces an easy formability by realizing a shape keeping as an electrode and by giving a function of combining catalyst supported carbons each other.

As the aqueous dispersion (Z) containing the thermoplastic resin, a fluorine resin dispersion, particularly, a polytetrafluoroethylene (PTFE) dispersion is preferably used.

As for the PTFE dispersion, 30J made by Du Pont-Mitsui Fluorochemicals Co. Ltd., D-1 and D-2, which are made by Daikin Industries Ltd., AD-1 and AD639, which are made by Asahi Glass Co., Ltd., and the like can be obtained as commercialized products. Moreover, they can be produced according to an emulsion polymerization method known in the technical field concerned, using a monomer such as tetrafluoroethylene under the presence of an appropriate solvent and a surfactant.

The PTFE dispersion used here contains water as a solvent, PTFE resin, and a surfactant as a major component. An average particle size of fluorine resin is preferably about 0.1 to 0.8 micron, and more preferably 0.2 to 0.4 micron. When a particle size is in this range, stability of the dispersion, dispersibility and stability of the catalyst ink at the time of making the electrode, are excellent.

As for the surfactant, a nonionic surfactant can preferably be used. Polyoxyethylenealkylphenylether and polyoxyalkylenealkylether can be preferably used, particularly.

A concentration of the PTFE resin and the surfactant in the PTFE dispersion is not particularly limited if the dispersion can be stable. For example, PTFE resin concentration of 50 to 65% and surfactant concentration of 2 to 5% can be obtained as commercialized products in abundant and at relatively low price, and used preferably.

As for the fluorine resin besides PTFE, polyvinylidene fluoride (PFV), perfluoroalkoxy fluorine resin (PFA), tetrafluoroethylene-propylene hexafluoride copolymer (FEP), ethylene-tetrafluoroethylene copolymer (ETFE) and the like can be used.

What can be suitably used as the aqueous dispersion (Z) containing the thermoplastic resin is aqueous solutions of hydrophilic resins such as polyvinyl alcohol, polyacrylamide, polyvinyl pyrrolidone, polyoxyalkylene, polyethylene glycol, polyglycerol and the like, in which molecular weights and degrees of saponification are various. Moreover, as a cross-linking agent that can cross-link these hydrophilic resins, dihydrazides, trihydrazides, dicarboxylic acids, tricarboxylic acids, diamines, triamines, dialdehydes, trialdehydes, diglycidyl ethers, triglycidyl ethers and the like may be used. Furthermore, polyacrylic acid, an acrylic acid-maleic acid copolymer, an acrylamide-acrylic acid hydrazide copolymer and the like can also be used as a cross-linking agent.

A combination ratio of these aqueous dispersions to an electron conductive material such as carbon is suitable to be 1:0.1 to 1:10. When less than 0.1, then adhesiveness between carbons is too small to be able to shape. When larger than 10, then electrode resistance becomes high and power generation performance decreases. These aqueous dispersions may be used only one species, or plural species together.

Moreover, these aqueous dispersions increase compatibility between the cross-linked compound (X) and the polymer material (Y) described above, and realize more uniform structure.

2. Gas Diffusion Layer

The gas diffusion layer 4 is the one optimizing the diffusion of gas or liquid such as methanol or water, for example, composed of a porous conductive sheet. The gas diffusion layer 4 is suitable to be water-repellent. In particular, in an electrode of cathode side, sometimes flooding may arise from water produced, however, by making the gas diffusion layer 4 water-repellent, produced water can be removed, and an occurrence of flooding can be effectively suppressed. Moreover, on the surface of the gas diffusion layer 4, a conductive intermediate layer can also be set preferably. As for the conductive intermediate layer, a mixture composed of water-repellent material of polytetrafluoroethylene (PTFE) and carbon black as an electron medium is preferable. In this case, a mixing ratio of the carbon black to the polytetrafluoroethylene (PTFE) is preferably, 3:7 to 7:3 in weight ratio, more preferably, 5:5. The thickness of the conductive intermediate layer is preferably an upper limit of 0.1 mm. When more than 0.1 mm, resistance value becomes large, sometimes, output decreases. Moreover, as for the carbon black, specific surface area of 10 $m^2/g$ or more can be preferably used.

As described above, the present invention has been explained using an electrode with a gas diffusion layer, however, the gas diffusion layer is not an essential component, and an electrode without a gas diffusion layer is also included in the present invention.

3. Manufacturing Method

Subsequently, a manufacturing method of the electrode according to the embodiment of the present invention is explained. Although a mixing method of materials is not particularly limited, by mixing according to the following processes, power generation performance is improved.

(a) Preparing a porous conductive sheet, an water-repellent treatment is done on this porous conductive sheet, then, the gas diffusion layer 4 is prepared. Water-repellent amount is suitable to be 5 to 50 wt % in the total weight of the porous conductive sheet. As for an water-repellent agent, not particularly limited, various water-repellent agents can be used.

(b) By mixing a polymer material (Y) containing an acid group or polymer materials (Y1, Y2) containing two kinds of acid groups with a catalyst supported carbon supported with catalyst, catalyst ink (1) is prepared. At this time, according to needs, water can be preferably used for mixing. A mixing method is not particularly limited, however, for example, the mixing can be done by using a stirrer, an ultrasonic dispersion machine, an ultrasonic homogenizer, a ball mill, a self-revolution mixer and the like.

(c) By adding a cross-linked compound (X) having a silicon-oxygen bond to the catalyst ink (1), and by mixing the resultant, catalyst ink (2) is prepared. At this time, according to needs, a solvent can be preferably used for mixing. For example, isopropyl alcohol and the like can be used. A mixing method is the same as the process (b).

(d) By adding an aqueous dispersion (Z) containing a thermoplastic resin to the catalyst ink (2), and by mixing the resultant, catalyst ink (3) is prepared. A mixing method is the same as the process (b). Here, in the catalyst ink (3), there exists an electrode binder containing (X), (Y), and (Z).

(e) The catalyst ink (3) is coated on the gas diffusion layer 4. A coating method is not particularly limited, however, for example, a paste method, a bar-coat method, a spray method, a screen printing method and the like can be used.

<Membrane-Electrode Assembly/Fuel Cell>

1. Proton Conducting Membrane

<Proton Conducting Membrane>

An example of preferable a proton conducting membrane combined with the electrode according to the embodiment of the present invention is shown. As for the proton conducting membrane according to the embodiment, a proton conducting membrane having cross-linked structure, for example, the following membranes can be preferably used, which are: 1) a proton conducting membrane (first proton conducting membrane) containing the acid group-containing structure (H) and the silicon-oxygen-containing/bonding structure (A); 2) a proton conducting membrane (second proton conducting membrane) in which the silicon-oxygen bonding structure (A) and the acid group-containing structure (B) are coupled to each other by the silicon-oxygen bond; or 3) a membrane (third proton conducting membrane) according to the second membrane, in which the acid group-containing structure (B) is a structure in which a silane compound (α) having the polymerizable unsaturated double bond and an acid group-containing compound (β) having the acid group and the polymerizable unsaturated double bond are covalently bonded to each other. In case of using these membranes, these membranes have high affinity for components contained in an electrode binder used to form the electrode of the present invention, particularly, a cross-linked compound (X) having a silicon-oxygen bond, and in case of remaining a silicon-oxygen unreacted in the membrane, a bond with (X) in the electrode binder can be formed, so a membrane-electrode assembly with high adhesion between a membrane and an electrode can be obtained.

1) First Proton Conducting Membrane (a) Acid Group-Containing Structure (H)

At the time when the fuel cell is in operation, the protons generated in the anode are supplied to the membrane, and meanwhile, the protons in the membrane are consumed in the cathode. Some protons are present in advance in the proton conducting membrane. In the anode, a concentration of the protons is increased by being supplied with the protons, and in the cathode, a concentration of the protons is decreased by consuming the protons. A concentration gradient of the protons, which occurs in the membrane as described above, is a driving force for the proton diffusion from the anode to the cathode. In the case where the protons are not sufficiently present in the membrane, then the protons on the cathode side fall short, and the stable operation of the fuel cell cannot be desired. Hence, in order to provide a proton conducting membrane for the fuel cell, which exhibits a high output, it is necessary to form proton conduction paths, where the acid groups are present at a high concentration, and the acid groups are arranged continuously.

In the present invention, the acid group-containing structure (H) and the silicon-oxygen-containing/bonding structure (A) are provided, whereby a strong cross-link is formed, the dissolution and the swelling, which are caused by the methanol and the like, are less likely to occur, and a state where the acid group is present at a high concentration in the membrane can be ensured. In addition, it becomes possible to increase the concentration of the protons in the membrane. In such a way, a membrane capable of achieving the operation of the fuel cell, which is stable for a long time and has a high output, is obtained.

As the acid group-containing structure (H) related to the first proton conducting membrane, the same one as the polymer material (Y) containing the acid group can be used. Specifically, mentioned are the polymers obtained by polymerizing the monomers such as the vinyl sulfonic acid, the allyl sulfonic acid, the 2-acrylamide-2-methylpropane sulfonic acid, the styrene sulfonic acid, the 2-(methacryloyloxy)ethylsulfonic acid, the 3-sulfopropyl methacrylate, the 4,4'-diaminostilbenzene-2,2'-disulfonic acid, the itaconic acid bis-(3-sulfopropyl), the acrylic acid and the methacrylic acid. The polymers obtained by polymerizing the vinyl phosphoric acid, the allyl phosphoric acid and the like, and the polyphosphoric acid can also be used. Moreover, the acid group-containing structure (H) may further contain the monomer unit that has the functional group capable of being bonded to the monomer that forms the polymer material (Y) and does not contain the acid group, or may further contain the cross-linking agent that has the plurality of functional groups capable of being bonded to the polymer material (Y) or the monomer that forms the polymer material (Y). As the former monomer unit, for example, the methyl(metha)acrylate, the ethyl(metha)acrylate, the (metha)acrylamide, the styrene and the like can be suitably used. As the latter cross-linking agent, for example, the N,N'-methylene bis(acrylamide), the neopentyl glycol diacrylate, the 1,4-bis(acryloyloxy)butane, the 1,3-bis(methacryloyloxy)-2-propanol, the trimethylolpropane triacrylate, the trimethylolpropane trimethacrylate, the 1-(acryloyloxy)-3-(methacryloyloxy)-2-propanol, the divinylbenzene, the 3-(methacryloylamino)propyl trimethyl ammonium chloride, the vinyl methacrylate and the like can be suitably used.

(b) Silicon-Oxygen Bonding Structure (A)

As the silicon-oxygen bonding structure (A), a structure represented by the general formula (I) is preferably used.

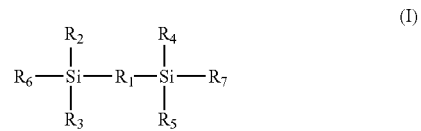

(wherein $R_1$ is a chain hydrocarbon group containable a substituent with a carbon number of 1 to 50 and/or a heteroatom, or is an oxygen atom, $R_2$, $R_3$, $R_4$, $R_5$, $R_6$ and $R_7$ are any of hydrogen atoms, methyl groups, ethyl groups, propyl groups, butyl groups, phenyl groups, methoxy groups, ethoxy groups, propoxy groups, butoxy groups, hydroxyl groups and O—Si—, and may be the same or different from one another, at least one of $R_1$ to $R_7$ contains an oxygen atom, at least one of $R_2$, $R_3$ and $R_6$ is O—Si concerned with the cross-link, and at least one of $R_4$, $R_5$ and $R_7$ is O—Si concerned with the cross-link.)

As represented by the above-described general formula, the silicon-oxygen bonding structure (A) is sometimes composed only of the inorganic matters, or is sometimes composed of an organic/inorganic composite mixed with the organic compound. In the case where the organic compound is mixed into the silicon-oxygen bonding structure (A), a fuel cell membrane that combines heat resistance inherent in the inorganic matters and softness inherent in the organic matters can be formed. In the case where such a compound is provided, it is possible to adjust the respective properties of the membrane, which include the softness, by designing a molecular structure among the cross-linked structures. By adjusting the concentration of the acid group, the molecular structure and a cross-link density, it also becomes possible to control the proton conductivity and the fuel barrier property, which are important characteristics of the electrolyte membrane for the fuel cell.

Some of cross-linked precursors which form these structures are directly commercially available. Moreover, it is possible to synthesize the cross-linked precursor by a hydrosilylating reaction of a silyl compound corresponding thereto in the case where the unsaturated bond is provided, and it is possible to similarly synthesize the cross-linked precursor also in the case where the hydroxyl group, the amino group and the like are provided.

Here, when the carbon number of $R_1$ exceeds 50, the cross-link becomes insufficient, and it becomes impossible to expect the swelling resistance and the heat resistance. As a preferable form of $R_1$, a hydrocarbon compound is mentioned. The hydrocarbon compound has high acid resistance, and is extremely stable. As hydrocarbons, an alkylene chain, an aromatic-containing chain and the like are mentioned. Among them, a linear molecular chain composed of a polymethylene chain that does not have a branch or the like is particularly preferable. A compound of a linear polymethylene chain is stable against an attack by acid, radical and the like, and is a material that can be preferably used as the electrolyte membrane for the fuel cell. Moreover, this compound has not only the stability but also a structure in which the linear polymethylene chain is bendable, and accordingly, it is possible to impart appropriate softness to the membrane, and it is also possible to adjust denseness thereof. These adjustments are achieved mainly by a molecular length of the polymethylene chain. Furthermore, $R_1$ may have some heteroatoms. The ether bond, the ester bond, the amide bond and the like can be suitably used from viewpoints of easiness of forming the bond, the softness of the structure, and availability of the raw materials.

As the silicon-oxygen bonding structure (A), for example, cross-linked structures composed by performing the hydrolysis and the polycondensation for the following can be preferably used, which are: bis(triethoxysilyl)methane; 1,2-bis(trimethoxysilyl)ethane; the 1,2-bis(triethoxysilyl)ethane; 1,6-bis(triethoxysilyl)hexane; the 1,8-bis(triethoxysilyl)octane; the 1,8-bis(diethoxymethylsilyl)octane; 1,8-bis(ethyldimethoxysilyl)octane; the 1,9-bis(triethoxysilyl)nonane; 1,4-bis(triethoxysilyl)benzene; 1,4-bis(trimethoxysilylmethyl)benzene; bis(trimethoxysilylethyl)benzene; and alkoxysilanes such as the tetramethoxysilane, the tetraethoxysilane, the tetraisopropoxysilane, the tetrabutoxysilane, the methyltrimethoxysilane, methyltriethoxysilane, the ethyltrimethoxysilane, ethyltriethoxysilane, the phenyltrimethoxysilane, the phenyltriethoxysilane, the dimethyldimethoxysilane, dimethyldiethoxysilane, the n-propyltrimethoxysilane, the i-propyltrimethoxysilane and the n-buthyltrimethoxysilane. The silicon-oxygen bonding structure (A) may be composed of one of these compounds, which is taken as a raw material, or may be composed of two or more of them, which are taken as raw materials. Moreover, such alkoxy groups of the above-described compound do not have to cause a perfect reaction; however, the compound takes a denser structure when the alkoxy groups causes the perfect reaction to form O—Si, and this is preferable from viewpoints of the heat resistance, the fuel barrier property and the mechanical strength. Furthermore, those in which the alkoxy groups of the listed compounds are substituted by other alkoxy groups can also be used similarly. Moreover, the present invention is not limited to this.

By using the appropriate silicon-oxygen bonding structure (A), silica cross-linked particles can also be formed. By adjusting a cross-link density and inter-particle bonding strength of the silica cross-linked particles, the strength and flexibility of the proton conducting membrane can also be appropriately controlled.

2) Second Proton Conducting Membrane (c) Acid Group-Containing Structure (B) that is Covalently Bonded to Silane Compound and has acid group Moreover, it is preferable that the acid group-containing structure (B) that is covalently bonded to the silane compound and has the acid group contains a structure (II) that is represented by a following structural formula, has the acid group, and can be bonded to the cross-linked structure of the membrane by the Si—O bond.

(II)

(wherein X is a —O— bond or an OH group, which is concerned with the cross-link, $R_{14}$ is a molecular chain group that has at least one acid group, $R_{15}$ is any of a methyl group, an ethyl group, a propyl group and a phenyl group, and m is any of 0, 1 and 2.)

At this time, $R_{14}$ has at least one acid group, and is bonded to a cross-link group by the covalent bonding. As the acid group, a variety of acids such as sulfonic acid, phosphonic acid, carboxylic acid, sulfuric acid, phosphoric acid and boric acid can be used. In particular, the sulfonic acid is preferably used, which has low pKa, is capable of sufficiently ensuring the concentration of the protons in the membrane, and is also thermally stable.

In the case where the acid group is the sulfonic acid, it is preferable that $R_{14}$ is a structure that is represented by a following formula (III).

(III)

(wherein, n is an integer of 1 to 20.)

Here, the structure between the sulfonic acid and the cross-linked structure is not particularly limited; however, in terms of the object of the present invention, it is necessary that the structure is excellent in heat resistance, acid resistance, oxidation resistance and the like. As one of the structures which meets these requirements, there is a polymethylene chain represented by the above formula (III). In a structure of this formula, the polymethylene chain is not branched, and the sulfonic acid group is present on a terminal end of the polymethylene chain.

Among them, 3-trihydroxysilyl propyl sulfonic acid that is one of raw materials of a structure in which n is 3 is commercially marketed by Gelest, Inc., a synthesis method thereof using allyl bromide as the raw material is also already established, and the 3-trihydroxysilyl propyl sulfonic acid concerned is easily available. Accordingly, the 3-trihydroxysilyl propyl sulfonic acid can be especially preferably used. Moreover, a cured body is fabricated by using, as a raw material, 3-mercaptopropyl trimethoxysilane (trade name "SAIRA-E-SU S-810" made by Shin-Etsu Chemical Co., Ltd.), and a mercapto group of this cured body is oxidized, whereby the structure of the above formula can also be realized.

Moreover, a cured body is fabricated by using, as a raw material, an oligomer or a polymer, which has a structure of a following formula (IV), and a mercapto group of this cured body is oxidized, whereby the structure of the above formula can also be realized.

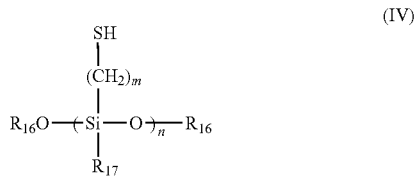
(IV)

(wherein $R_{16}$ is any of a H group, a $CH_3$ group, a $C_2H_5$ group, a $C_3H_7$ group and a $C_6H_5$ group, $R_{17}$ is any of the $CH_3$ group, the $C_2H_5$ group, the $C_3H_7$ group, the $C_6H_5$ group, an OH group, an $OCH_3$ group, an $OC_2H_5$ group, an $OC_6H_5$ group, and the O—Si bond, m is an integer of 1 to 20, and n is an integer of 3 to 500.)

Here, the one in which, in the above formula (IV), $R_{17}$ is the $OCH_3$ group, m is 3 and n is 10 is commercially marketed by Shin-Etsu Chemical Co., Ltd. (X-41-1805).

(d) Silicon-Oxygen Bonding Structure (A)

The silicon-oxygen bonding structure (A) is the same as the above-mentioned one; however, the silicon-oxygen bonding structure (A) is used concurrently with the structure (II) represented by the above-described structural formula, and is thereby coupled to the acid group-containing structure (B) by the silicon-oxygen bond, whereby a proton conducting membrane is obtained, in which, while maintaining a high concentration of the acid group, the dissolution and the swelling, which are caused by the methanol, are less likely to occur, and the softening and the deformation, which are caused by heat, are small.

3) Third Proton Conducting Membrane (e) Silicon-Oxygen Bonding Structure (A)

As a silicon-oxygen bonding structure (A), the structure represented by the above-mentioned general formula (I) is preferably used, and the silicon-oxygen bonding structure (A) is substantially similar to the above-mentioned silicon-oxygen bonding structure (A).

(f) Acid Group-Containing Structure (B) that is Covalently Bonded to Silane Compound and has Acid Group It is preferable that the third proton conducting membrane contains, as the acid group-containing structure (B), the structure in which the silane compound (α) having the polymerizable unsaturated double bond and the acid group-containing compound) (β) having the acid group and the polymerizable unsaturated double bond are covalently bonded to each other.

For example, the third proton conducting membrane is composed so as to contain at least the silicon-oxygen bonding structure (A) that serves as a basic cross-linked structure (skeleton) and the acid group-containing structure (B) in which the acid group-containing compound (β) reacts with and is bonded to the silane compound (α), and so that the silicon-oxygen bonding structure (A) and the acid group-containing structure (B) can form a siloxane bond. Alternatively, the third proton conducting membrane may be such a proton conducting membrane in which, in addition to that the silane compound (α) and the acid group-containing compound (β) are bonded to each other, a plurality of silane compounds (α) and a plurality of the acid group-containing compounds (β) individually form polymers, or a cross-linking agent (C) to be described below forms a cross-linked compound together with the silane compound (α), the acid group-containing compound (β) or another cross-linking agent (C).

In general, the silicon-oxygen cross-linked compound is rigid in terms of structure. Accordingly, when the silicon-oxygen cross-linked compound has many portions with high polarity, temperature variations sometimes cause performance deteriorations of the proton conductivity and the fuel barrier property. In the present invention, atoms groups which compose the acid in the acid group-containing compound (β) are coupled to one another while interposing the silane compounds (α) therebetween, whereby it is possible to form the cross-linked structure so that a distance between the atom groups which compose the acid and the silicon can be a fixed value or more. Accordingly, various characteristics of the membrane, such as high fuel barrier property and high strength, can be further enhanced. Moreover, many organic regions are provided in the acid group-containing structure (B), whereby the softness is imparted to the proton conducting membrane, and impact resistance of the proton conducting membrane is strengthened. Furthermore, the cross-linking agent (C) is introduced according to needs, whereby a soft and strong cross-linked structure can be obtained, and accordingly, the high impact resistance and the high polar solvent resistance are further strengthened.

Note that, in the acid group-containing structure (B), it is preferable that the atoms which compose the acid group and silicon atoms bonded to the silicon-oxygen bonding structure (A) are bonded to each other while interposing a bond of at least four continuous carbon atoms therebetween. In such a way, it becomes possible to suppress a breakage and characteristic deterioration of the membrane owing to sudden invasion of the polar solvent, which may sometimes occur in the case where the distance between the acid group and the silicon, which compose the bond, is small.

(g) Silane Compound (α)

As the silane compound (α) concerned with the structure of the acid group-containing structure (B), suitably used are the 3-(trimethoxysilyl)propyl acrylate, the 3-(methyldimethoxysilyl)propyl acrylate, the 3-(triethoxysilyl)propyl acrylate, the 3-(methyldiethoxysilyl)propyl acrylate, the trimethoxy vinyl silane, the triethoxy vinyl silane, the 3-(trimethoxysilyl) propyl methacrylate, the 3-(methyldimethoxysilyl)propyl methacrylate, the 3-(triethoxysilyl)propyl methacrylate, the 3-(methyldiethoxysilyl)propyl methacrylate, the p-styryltrimethoxysilane, the p-styryltriethoxysilane, and the like. As the compound for use in the present invention, a compound having the silicon-oxygen bond and the unsaturated double bond is particularly preferable.

(h) Acid Group-Containing Compound (β)

As the acid group-containing compound (β) concerned in the structure of the acid group-containing structure (B), a compound having the acid group and the polymerizable unsaturated double bond is preferable, a compound that has three or more heteroatoms to which the protons are addable and has the acid group and the polymerizable unsaturated double bond is more preferable, and an acid group-containing compound (β) containing the sulfonic acid group is still more preferable.

More preferably, the acid group-containing compound (β) is acrylic ester or methacrylic ester, and a sulfur atom that composes the sulfonic acid group and an oxygen atom that composes the ester bond are bonded to each other while interposing a bond of at least two continuous carbon atoms therebetween.

Still more preferably, the acid group-containing compound (β) has an acrylamide group, and the sulfur atom that composes the sulfonic acid group and a nitrogen atom that composes the acrylamide group are bonded to each other while interposing the bond of at least two continuous carbon atoms therebetween.

As the acid group-containing compound (β) as described above, the 2-acrylamide-2-methylpropane sulfonic acid, the 2-(methacryloyloxy)ethylsulfonic acid, the 3-sulfopropyl methacrylate, p-stilsulfonic acid, the 4,4'-diaminostilbenzene-2,2'-disulfonic acid, the itaconic acid bis-(3-sulfopropyl), and the like can be preferably used.

(i) Other Additives

In the proton conducting membrane according to the present invention, the cross-linking agent (C) may be further contained, and a compatibilizing agent (D) may be further contained.

As the cross-linking agent (C), a cross-linking agent that has, in a single molecule, two or more functional groups bondable to the silane compound (α) and the acid group-containing compound (β) which are the constituent components of the acid group-containing structure (B), is preferable. As the cross-linking agent (C), for example, hydrocarbon cross-linking agents such as the N,N'-methylene bis(acrylamide), the neopentyl glycol diacrylate, the 1,4-bis(acryloyloxy)butane, the 1,3-bis(methacryloyloxy)-2-propanol, the trimethylolpropane triacrylate, the trimethylolpropane trimethacrylate, the 1-(acryloyloxy)-3-(methacryloyloxy)-2-propanol, the divinylbenzene, the 3-(methacryloylamino) propyl trimethyl ammonium chloride and the vinyl methacrylate can be preferably used. Moreover, a fluoromonomer such as 2,2,2,-trifluoroehylacrylate and 2,2,2-trifluoroethylmethacrylate may be contained in the cross-linking agent (C). Moreover, the above-mentioned (Y) or the electrolyte material that has the proton conductivity may be added as another acid component to the cross-linking agent (C).

Note that, in order to enhance the strength of the proton conducting membrane, the membrane may be formed by immersing the above-described additive into a porous polymer material. As a raw material of the polymer material, for example, a polymer material composed of a fluorine resin, polyethylene or polyimide can be used. As the polymer material composed of the fluorine resin, the polyethylene or the polyimide, a porous material is used, in which a film thickness is 20 to 100 µm, a porous diameter is 0.05 to 10 µm, preferably 0.1 to 1.0 µm, and a porosity is 60% or more to 98% or less, preferably 90% or more to 95% or less. It is preferable that the porous material is subjected to a hydrophilic treatment. As the fluorine resin, polytetrafluoroethylene can be suitably used.

Moreover, a proton conducting membrane that concurrently uses the electrolytes composing these proton conducting membranes 1 to 3 can also be suitably used.

In the case of using the above-described membrane, the membrane has high affinity with the components contained in the electrode binder forming the electrode of the present invention, and in particular, with the cross-linked compound (X) having the silicon-oxygen bond, and moreover, the membrane can form the bond together with (X) in the electrode binder in the case where the unreacted silicon-oxygen is left in the membrane. Accordingly, a membrane-electrode assembly in which the adhesiveness between the membrane and the electrode is high is obtained. Moreover, chemical structures of the electrolytes composing the membrane are relatively soft, and accordingly, the performance deterioration is small also against a humidity change and an external pressure such as sudden swelling.

2. Membrane-Electrode Assembly

FIG. 1 is a schematic view showing the membrane-electrode assembly using the electrode according to the embodiment of the present invention. The electrodes 5 are arranged on both surfaces of the proton conducting membrane 1 (note that, only one side is shown in FIG. 1). On this occasion, the catalyst layer 3 of the electrode 5 is bonded directly (not shown) or through the junction layer 2 to the proton conducting membrane 1.

The junction layer 2, which is the one bonding an electrode to a proton conducting membrane finished, for example, can be formed from a junction agent produced by mixing the cross-linked compound (X) described above and a polymer material (Y), diluted with water.

When an electrode binder solidified material 3 a contained in the catalyst layer 3 of the electrode 5 is adhesive, then the junction layer 2 becomes unnecessary.

3. Fuel Cell

Figure 2:
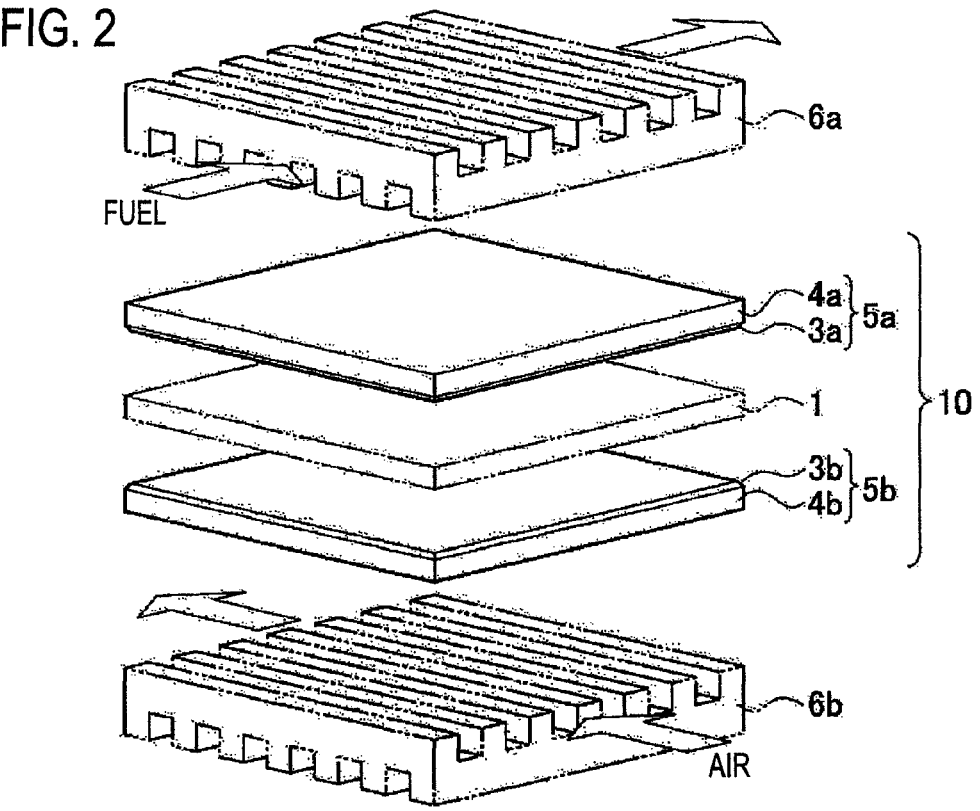
FIG. 2 is a schematic view showing a fundamental structure of PEFC type fuel cell 20 having electrode 5a, 5b according to an embodiment. Reference numerals in FIG. 2 denote as follows: 1 for an electrolyte membrane (a proton conducting membrane); 3a, 3b for a catalyst layer; 4a, 4b for a gas diffusion layer; 5a, 5b for an electrode; 6a, 6b for a separator; 10 for a membrane-electrode assembly.

FIG. 2 shows a fundamental structure of a fuel cell that has electrodes according to the embodiment of the present invention. The electrodes 5a and 5b are shown by solid line, and structures besides them are shown in double dot chain line. The fuel cell 20 is composed of the membrane-electrode assembly 10 (unit cell) put electrodes 5a, 5b on both surfaces of the proton conducting membrane 1, and a pair of separators 6a, 6b becoming a path of fuel and oxygen put in the outside of the membrane-electrode assembly 10. Further, the separators 6a, 6b are not indispensable ones, and a structure without the separators 6a, 6b can also be adopted.

By means of this structure, a desired electric power can be taken out. Further, according to needs, a structure can also be formed by multiplying the structure described above and combining plural neighboring unit cells each other electrically. Further, not shown in the figure, outside of both separators described above, an electric collector plate is arranged to take out an electric current.

4. Manufacturing Method 4-1. Proton Conducting Membrane

Here, as an example, a manufacturing method of the proton conducting membrane made of the electrolyte composed of the second proton conducting membrane and the third one described above, is explained.

For example, the proton conducting membrane suitable for the present invention can be fabricated by: a first step of preparing a mixture containing a mercapto group-containing compound (E) having a mercapto group, and has a hydrolytic silyl group covalently bonded to the mercapto group and capable of a condensation reaction, and/or a silanol group, and containing a polarity control agent (F); a second step of forming a polymerizable composition by mixing a silicon-oxygen structure (A), a silane compound (α) and an acid group-containing compound (β) into the mixture obtained in the first step; a third step of depositing the polymerizable composition obtained in the second step; a fourth step of constructing a silicon-oxygen cross-linked structure by hydrolyzing and condensing a hydrolytic silyl group and/or by condensing a silanol group; and a fifth step of converting the mercapto group in the membrane into a sulfonic acid group by oxidation, and introducing the sulfonic acid group.

—First Step—

In the first step, the mixture containing the mercapto group-containing compound (E) having the mercapto group, and has the hydrolytic silyl group covalently bonded to the mercapto group and capable of the condensation reaction, and/or the silanol group, and containing the polarity control agent (F) is prepared.

(a) Mercapto Group-Containing Compound (E):

The mercapto group-containing compound (E) is not particularly limited as long as it has the mercapto group, and has the hydrolytic silyl group covalently bonded to the mercapto group and capable of the condensation reaction, and/or the silanol group.

As examples of the mercapto group-containing compound (E), for example, illustrated are 3-mercaptopropyl trimethoxysilane, 3-mercaptopropyl triethoxysilane, 3-mercaptopropyl tripropoxysilane, 3-mercaptopropyl tributoxysilane, 2-mercaptoethyl trimethoxysilane, 2-mercaptoethyl tripropoxysilane, 2-mercaptoethyl tributoxysilane, mercaptomethyl trimethoxysilane, 3-mercaptopropyl methyldimethoxysilane, 3-mercaptopropyl methyldiethoxysilane, 3-mercaptopropyl methyldipropoxysilane, 3-mercaptopropyl methyldibutoxysilane, 3-mercaptopropyl methyldimethoxysilane, 3-mercaptopropyl butyldiethoxysilane, 3-mercaptopropyl phenyldimethoxysilane, mercaptomethyl methyldiethoxysilane, and the like. However, the present invention is not limited to these.

Among them, the 3-mercaptopropyl trimethoxysilane (made by Shin-Etsu Chemical Co., Ltd.) is available in a large amount at a low price, and can be preferably used.

Note that, as the mercapto group-containing compound (E), a condensate of a mercapto group-containing compound, which is obtained by condensing the mercapto group-containing compound, may be used.

(b) Polarity Control Agent (F):

The polarity control agent (F) is a structure control agent for forming particles, and can be suitably used in the present invention. The polarity control agent (F) is an organic liquid, and desirably, is water-soluble.

As such an organic matter, mentioned are the one having a polar substituent such as the hydroxyl group, the ether group, the amide group and the ester group, the one having an acid group such as the carboxylic acid group and the sulfonic acid group or salt thereof, the one having a basic group such as amine or salt thereof, and the like.

Specifically, mentioned are: glycerin and a derivative thereof; ethylene glycol and a derivative thereof; ethylene glycol polymers (diethylene glycol, triethylene glycol, tetraethylene glycol, polyethylene glycols with a variety of molecular weights, and the like); saccharides such as glucose, fructose, mannite, sorbit and sucrose; polyvalent hydroxyl group compounds such as pentaerythritol; water-soluble resins such as polyoxyalkylene, polyvinyl alcohol, polyvinyl pyrrolidone and acrylic acid; carbonate esters such as ethylene carbonate and propylene carbonate; alkyl sulfoxides such as dimethyl sulfoxide; amides such as dimethyl formamide; polyoxyethylene alkyl ethers such as ethylene glycol monomethyl ether; and the like; however, the present invention is not limited to these.

(c) Mixing Method:

In the case of preparing these mixtures, a solvent may be used. The solvent for use just needs to be capable of uniformly mixing the respective materials with one another, and no particular limitations are thereon. In general, water; alcohol solvents such as methanol, ethanol, 1-propanol, 2-propanol and t-butanol; ether solvents such as tetrahydrofuran, 1,4-dioxane; and the like can be suitably used.

—Second Step—

In the second step, the polymerizable composition obtained by mixing the silicon-oxygen bonding structure (A), the silane compound (α) and the acid group-containing compound (β) into the mixture obtained in the first step is prepared. The silane compound (α) and the acid group-containing compound (β) are used while being appropriately adjusted, whereby the polymerizable composition can impart the softness and the high polar solvent resistance to the proton conducting membrane in comparison with the case of fabricating the membrane by using only the mixture obtained in the first step.

As the silicon-oxygen bonding structure (A), the above-mentioned compounds can be used. Among them, the tetramethoxysilane and the tetraethoxysilane are universal articles, and are easily available in a large amount at a low price, and accordingly, can be preferably used. As the silane compound (α), the above-mentioned compounds can be used. Among them, the 3-(trimethoxysilyl)propyl methacrylate (made by Tokyo Chemical Industry Co., Ltd.) can be preferably used. As the acid group-containing compound (β), the above-mentioned compounds can be used. Among them, the 2-acrylamide-2-methylpropane sulfonic acid (made by Wako Pure Chemical Industries, Ltd.) can be preferably used.

In the second step, it is preferable to add the cross-linking agent (C). As the cross-linking agent (C), the above-mentioned compounds can be used. Among them, the trimethylolpropane triacrylate, the neopentyl glycol diacrylate and the like can be preferably used.

Moreover, in the second step, an arbitrary component such as a compatibilizing agent that is sodium dodecyl sulfate and the like, a photopolymerization initiator, a thermal polymerization initiator and the like can be added within the range where the object of the present invention is not damaged.

—Third Step—

In the third step, the polymerizable composition obtained in the second step is formed (deposited) into a membrane shape. In order to form the polymerizable composition, which is obtained in the second step, into the membrane shape, publicly known methods such as casting, coating and cast molding can be used. A method of forming the polymerizable composition into the membrane shape is not particularly limited as long as a uniform membrane can be obtained. A thickness of the membrane is not particularly limited; however, the membrane can be formed so as to have an arbitrary thickness from 10 μm to 1 mm. A membrane thickness of the proton conducting membrane for the fuel cell is appropriately decided based on the proton conductivity, the fuel barrier property and the mechanical strength of the membrane, and in usual, a membrane that has a thickness ranging from 20 to 300 μm can be preferably used. Accordingly, the proton conducting membrane of the present invention is also fabricated so that the membrane thickness thereof can conform to the above-described thickness.

Moreover, in the case of performing this deposition step, a support body or a reinforcement material, which is such as fiber, a mat and a fibril, may be added, or the polymerizable composition may be impregnated into these support bodies. Such a support body or a reinforcement material can be used after being appropriately selected from a glass material, a silicon resin material, a fluorine resin material, a cyclic polyolefin material, an ultrahigh molecular weight polyolefin material and the like in consideration of the heat resistance and the acid resistance.

As an impregnation method, a publicly known method such as a dip method, a potting method, a roll press method and a vacuum press method can be used without limitations, and moreover, the polymerizable composition may be heated, pressurized, and so on.

In the present invention, in order to reinforce the proton conducting membrane, multifariously, a polymer material composed of a fluorine resin, polyethylene or polyimide is preferable to be immersed. As for the polymer material composed of the fluorine resin, the polyethylene or the polyimide, a porous material with thickness of 20 to 100 μm, pore diameter of 0.05 to 0.2 μm and porosity of 60% or more can be preferably used. The porous material is preferable to be done a hydrophilic treatment. As for the fluorine resin, the polytetrafluoroethylene can be preferably used.

—Fourth Step—

In the fourth step, the hydrolytic silyl group contained in the membrane-like matter deposited in the third step is hydrolyzed and condensed, and/or the silanol group contained therein is condensed, whereby a membrane that contains, as a constituent element, the continuum of the particles, which is composed of the silicon-oxygen cross-linked structure, is formed.

The proton conducting membrane in the present invention is characterized in forming the cross-linked structure by the hydrolysis and condensation of an alkoxy silyl group and the like, stably exerting the proton conductivity even at a high temperature, and also hardly causing a shape change and the like. Such creation of the Si—O—Si bond by the hydrolysis and condensation of the alkoxy silyl group and the like is well known as a sol-gel reaction.

In the sol-gel reaction, it is common to use a catalyst in order to accelerate and control the reaction. In usual, acid or a base is used as the catalyst.

(d) Catalyst (G):

The catalyst (G) for use in the manufacturing method of the proton conducting membrane of the present invention may be either the acid or the base. In the case of using the acid catalyst, Bronsted acid such as hydrochloric acid, sulfuric acid, phosphoric acid and acetic acid is used. A type, a concentration and the like of the acid are not particularly limited, and the acid just needs to be an available one.

As the base catalyst, sodium hydroxide, potassium hydroxide, ammonia and organic amines can be preferably used. Moreover, as a condensation catalyst, fluoride such as potassium fluoride, ammonium fluoride, tetramethylammonium fluoride and tetraethylammonium fluoride may be used.

The step of introducing the catalyst may be performed at any timing from the first step to the fourth step. The simplest method is a method of introducing the catalyst at the time of preparing the mixture in the first step; however, in this case, it is necessary to consider the pot life and the setting time in the deposition as the third step.

(e) Condensation Reaction:

It is possible to perform the condensation reaction for the alkoxy silyl group and the like even at room temperature; however, heating should be performed in order to shorten a reaction time and to perform more efficient curing. A publicly known method just needs to be used for the heating, and heating by an oven, pressurization/heating by an autoclave, far infrared ray heating, electromagnetic induction heating, microwave heating and the like can be used. The heating can be performed at an arbitrary temperature from the room temperature to 300° C., and preferably, is performed at 100 to 250° C. At this time, the heating may be performed under reduced pressure or under inert gas such as nitrogen and argon.

Moreover, for the heating, a method of avoiding a sudden environment change may be adopted. For example, in the method, the temperature is gradually raised to a high temperature after curing the above-described subjects (membrane) at the room temperature for a certain time.

Moreover, the heating may be performed under vapor in order to supply water required for the hydrolysis, or may be performed under solvent vapor in order to prevent sudden drying of the membrane.

According to needs, an unreacted matter and a cured catalyst may be removed by water rinsing from the membrane already subjected to the fourth step, and the membrane may be further subjected to ion exchange by the sulfuric acid and the like.

—Fifth Step—

In the manufacturing method of the proton conducting membrane of the present invention, the fifth step is a step of oxidizing the mercapto group in the membrane into the sulfonic acid group, and introducing the sulfonic acid group into the surfaces of the particles.

As water for use in washing, water that does not contain metal ions, such as distilled water and ion-exchanged water, is preferable. In the water rinsing, heating may be performed, or the water rinsing may be made more efficient by applying a pressure and giving vibrations. Moreover, in order to promote penetration of the sulfonic acid group into the membrane, a mixed solvent obtained by adding methanol, ethanol, n-propanol, i-propanol, acetone, tetrahydrofuran or the like to water may be used.

The mercapto group oxidation method for use in the present invention is not particularly limited, and a general oxidizer can be used. Specifically, for example, as mentioned in Shin Jikken Kagaku Koza (issued by Maruzen, 3rd edition, Volume 15, 1976), oxidizers such as nitric acid, hydrogen peroxide, oxygen, organic peroxide (percarboxylic acid), bromine water, hypochlorite, hypobromite, potassium permanganate and chromic acid can be used.

The membrane fabrication method described above is a preferable example, and the present invention is not limited to this method. For example, if the mixture obtained in the first step is used as a main component, and the membrane is fabricated by subjecting the mixture to the third step, the fourth step and the fifth step, then a membrane in which the heat resistance and the fuel barrier property are higher is obtained. Moreover, in another example, if the membrane is fabricated by subjecting the composition, which is obtained in the second step, to the third step and the fourth step, then a membrane in which the softness and the membrane-electrode adhesiveness are higher is obtained.

In the case of using this membrane, the affinity thereof with the component contained in the electrode binder forming the electrode of the present invention, and in particular, with the cross-linked compound (X) having the silicon-oxygen bond is high. Moreover, in such a case where the unreacted silicon-oxygen is left in the membrane, the membrane can form the bond together with (X) in the electrode binder. Accordingly, the membrane-electrode assembly in which the adhesiveness between the membrane and the electrode is high is obtained.

4-2 Membrane-Electrode Assembly/Fuel Cell

Next, a membrane-electrode junction agent arranged on both surfaces of the proton conducting membrane is produced. Here, the cross-linked compound (X) and the polymer material (Y), which are already described, are prepared, and are mixed together under a dilution with water and the like, whereby the membrane-electrode junction agent is produced.

Next, the membrane-electrode junction agent is coated on the surface of the proton conducting membrane or on the surface of the electrode, which is to be pasted onto the surface of the proton conducting membrane. As a coating method, for example, there can be used a roll coating method, a spray coating method, a doctor blade method, a dip coating method, a transfer method, an electrodeposition coating method, and the like.

Next, the proton conducting membrane and the electrode are pasted to each other while interposing the membrane-electrode junction agent therebetween. At the time of this pasting, a pressure may be applied or heating given to subjects concerned. A preferable lower limit of a temperature at the pasting time is 20° C., and an upper limit thereof is not particularly limited; however, the upper limit should be appropriately set to an extent where the physical properties of the membrane are not damaged, and in usual, it is preferable to perform the heating at a temperature of 300° C. or less. Moreover, the proton conducting membrane and the electrode are pasted to each other while applying the pressure thereto, whereby intimate adhesiveness between the proton conducting membrane and the electrode is enhanced, and accordingly, a junction plane in which proton conduction efficiency is high can be formed. The pressure is not particularly limited, and an optimum value thereof depends on a pressure application method and the electrode for use; however, it is preferable to set the pressure at 0.16 kN/cm$^2$ or more and a pressure at which the electrode and the membrane are not broken or less.

Next, the membrane-electrode assembly obtained by pasting the electrode is cured. At this time, it is preferable to heat the membrane-electrode assembly. A heating method is not particularly limited, and arbitrary heating methods such as heating by a heat source such as the oven, the far infrared heating and induction heating can be used.

In order to form a fuel cell, further, a pair of separators which serve as passages of the fuel and the oxygen are arranged on outsides of the membrane-electrode assembly cured, and current collectors which take out a current are arranged on outsides of both of the separators.

According to needs, it is also possible to construct the polymer electrolyte fuel cell in such a manner that a plurality of configurations are stacked in multi-stages, and that a plurality of the adjacent unit cells are electrically coupled to one another.

Note that the separators themselves are not essential, and a configuration in which the separators are not arranged can also be adopted.

EXAMPLES

Nest, a description will be made below of examples in order to describe the present invention in more detail; however, the present invention is not limited only to these examples.

Example 1: Fundamental electrode 1+Nafion membrane
Example 2: Polymer material (Y) in catalyst layer modified 1+Nafion membrane
Example 3: Fundamental electrode 1+membrane 1 containing silicon-oxygen bonding structure (membrane-electrode junction agent used)
Example 4: Polymer material (Y) in catalyst layer modified 1+membrane I containing silicon-oxygen bonding structure (membrane-electrode junction agent used)
Example 5: Electrodes with catalyst layers made by different mixing methods+Nafion membrane
Example 6: Electrodes with catalysts made by different mixing methods+membrane 1 containing silicon-oxygen bonding structure (membrane-electrode junction agent used)
Comparative Example 1: Electrode used Nafion+Nafion membrane
Comparative Example 2: Electrode used Nafion+membrane 1 containing silicon-oxygen bonding structure (membrane-electrode junction agent used)
Example 7: Fundamental electrode 2+membrane 2 containing silicon-oxygen bonding structure
Example 8: Polymer material (Y) in catalyst layer modified 2+Nafion membrane
Example 9: Fundamental electrode 3+Nafion membrane
Example 10: Polymer material (Y) in catalyst layer modified 2+membrane 3 containing silicon-oxygen bonding structure (membrane-electrode junction agent used)
Example 11: Fundamental electrode 3+membrane 3 containing silicon-oxygen bonding structure (membrane-electrode junction agent used)
Example 12: Polymer material (Y) in catalyst layer modified 2+membrane 4 containing silicon-oxygen bonding structure (membrane-electrode junction agent used)
Example 13: Fundamental electrode 3+membrane 4 containing silicon-oxygen bonding structure (membrane-electrode junction agent used)

Example 1

1-1. Fabrication of Gas Diffusion Layer

A porous conductive sheet (TGP-H-060, made by Toray Industries Inc.; Thickness: 190 μm) was impregnated into an aqueous solution of Neoflon ND-1 (made by Daikin Industries Ltd.), and the impregnating was done repeatedly until its weight reaches to 10 to 15 wt %. Thereafter, a resultant thus obtained was heated at 300° C. for 30 minutes (water-repelling treatment) . . . . S111

1-2. Production of Catalyst Ink 2.0 g of poly(2-acrylamide-2-methylpropane sulfonic acid) (in which a 15% aqueous solution made by Sigma-Aldrich Corporation was diluted by water to 2.5%), 0.3 g of catalyst supported carbon (for the cathode, platinum supported carbon: TEC10E50E made by Tanaka Kikinzoku Kogyo K. K.; Pt 48%, for the anode, platinum-ruthenium supported carbon: TEC61E54 made by Tanaka Kikinzoku Kogyo K. K.; Pt 30% Ru 23%, were used) were mixed. In the mixing, an ultrasonic homogenizer was used.

0.6 g of tetramethoxysilane was added to the mixture described above, followed by mixing using the ultrasonic homogenizer. Furthermore, 0.5 g of isopropyl alcohol was added to the resultant, followed by mixing using the ultrasonic homogenizer.

0.3 g of PTFE dispersion (PTFE30J, made by Du Pont-Mitsui Fluorochemicals Co. Ltd.; PTFE content: 55 to 60%; poly(oxyethylene)octylphenylether: 3.6%; water: 35 to 45%; average particle diameter of fluorine resin: 0.22 micron) was added to the mixture described above, followed by mixing using the ultrasonic homogenizer. In such a way, a catalyst ink was produced . . . . S112

1-3. Fabrication of Electrode

Two gas diffusion layers were fabricated in S111, a catalyst ink for the anode and that for the cathode produced in S112 were coated thin and uniform on each diffusion layer, respectively. In the coating, a tool and a pallet were used. These were pressed at 120° C.-1 kN for three minutes by using a press machine (made by Sintokogio, Ltd.), whereby an anode electrode and a cathode one were fabricated. In the anode electrode, platinum amount was 0.5 mg/cm$^2$ and ruthenium amount was 0.3 mg/cm$^2$. Platinum amount in the cathode was 0.5 mg/cm$^2$. . . . S113

1-4. Fabrication of Membrane-Electrode Assembly

The anode electrode and the cathode electrode fabricated in S113 were cut into 2.5 cm squares, respectively, and were joined to Nafion 117 (made by Du Pont Corporation) as an electrolyte membrane, and a resultant thus obtained was defined as a membrane-electrode assembly. At this time, the press machine described above was used, and the resultant was pressed at 140° C.-1.5 kN for three minutes, whereby a membrane-electrode assembly was fabricated . . . . S114

Example 2

2-1. Fabrication of Gas Diffusion Layer

A diffusion layer was fabricated in a similar way to S111 of Example 1.

2-2. Production of Catalyst Ink 2.0 g of the poly(2-acrylamide-2-methylpropane sulfonic acid) (in which a 15% aqueous solution made by Sigma-Aldrich Corporation was diluted by water to 2.5%), 1.0 g of poly(styrene sulfonic acid) (in which a 18% aqueous solution made by Sigma-Aldrich Corporation was diluted by water to 2.5%), 0.3 g of the catalyst supported carbon (for the cathode, platinum supported carbon: TEC10E50E made by Tanaka Kikinzoku Kogyo K. K.; Pt 48%, for the anode, platinum-ruthenium supported carbon: TEC61E54 made by Tanaka Kikinzoku Kogyo K. K.; Pt 30% Ru 23%, were used) were mixed. In mixing, the ultrasonic homogenizer was used.

0.6 g of the tetramethoxysilane was added to the mixture described above, followed by mixing using the ultrasonic homogenizer. Furthermore, 0.5 g of the isopropyl alcohol was added to the resultant, followed by mixing using the ultrasonic homogenizer.

0.3 g of the PTFE dispersion (PTFE30J, made by Du Pont-Mitsui Fluorocheuncals Co. Ltd.) was added to the mixture described above, followed by mixing using the ultrasonic homogenizer, whereby a catalyst ink was produced . . . . S112'

2-3. Fabrication of Electrode

The catalyst ink produced in S112' described above was used as a catalyst ink. Except for this, an electrode was fabricated in a similar way to S113 of Example 1. In the anode electrode, platinum amount was 0.5 mg/cm$^2$ and ruthenium amount was 0.3 mg/cm$^2$. Platinum amount in the cathode electrode was 0.5 mg/cm$^2$. . . . S113'

2-4. Fabrication of Membrane-Electrode Assembly (MEA)

The electrode fabricated in S113' described above was used as an electrode. Except for this, a membrane-electrode assembly was fabricated in a similar way to S114 of Example 1. . . . S114'

Example 3

3-1. Fabrication of Proton Conducting Membrane 0.12 g of water and 0.060 g of triethylamine were dropped into a liquid obtained by mixing 4.07 g of a copolymer (X-41-1805, made by Shin-Etsu Chemical Co., Ltd.) of 3-mercaptopropyl trimethoxysilane and tetraethoxysilane and 1.0 g of the tetraethoxysilane with each other. A resultant solution was stirred at the room temperature for 20 minutes until becoming transparent, and was thereafter developed on a fluorine film. On this solution, a polyethylene-made porous material (average pore diameter: 0.5 μm; thickness: 50 μm; cut into a square with a side of 10 cm) was covered, and the porous material was impregnated with this liquid. The liquid was impregnated into the porous material by using a polyethylene-made pallet so as not to cause unevenness. Thereafter, such a membrane obtained after the impregnation was covered with a fluorine resin film, and an applicator was allowed to level this resultant from the above so that a membrane thickness of the impregnated porous material could be 50 μm.

The impregnated porous material was aged at the room temperature for eight hours while being left covered with the fluorine resin film, and thereafter, the fluorine resin film was peeled off therefrom, and the porous material was further aged for 16 hours. The aged membrane was sandwiched between fluorine resin films, these were further sandwiched between two glass plates, and in this state, these were put into a glass-made container together with 500 mL of water, and was heated and cured at 80° C. for 24 hours by using a gear oven. Thereafter, these were fired at 120° C. for eight hours. The fired membrane was moved to another glass-made container, and was immersed into a 1N hydrochloric acid solution and water individually for one hour under the condition of 80° C., whereby the unreacted matter and the catalyst were extracted from the membrane. After an extract was removed, the membrane was immersed into peracetic acid prepared by mixing 125 mL of acetic acid and 100 mL of 30% hydrogen peroxide water with each other, and was heated at 60° C. for one hour by a hot plate. The obtained membrane was taken out of the peracetic acid solution, and was immersed into water of 80° C. three times individually for one hour, whereby the peracetic acid solution was sufficiently removed therefrom. In such a way, a translucent membrane was obtained. This was defined as a proton conducting membrane . . . . S121

3-2. Preparation of Membrane-Electrode Junction Agent 2.0 g of the poly(2-acyrlamide-2-methylpropane sulfonic acid) (in which a 15% aqueous solution made by Sigma-Aldrich Corporation was diluted by water to 2.5%), 0.2 g of the tetramethoxysilane, and 0.2 g of the PTFE dispersion (PTFE 30J, made by Du Pont-Mitsui Fluorochemicals Co. Ltd.) were mixed, whereby a membrane-electrode junction agent was produced . . . . S122

3-3. Fabrication of Membrane-Electrode Assembly

The membrane-electrode junction agent produced in S122 was sufficiently impregnated on both surfaces of the proton conducting membrane fabricated in S121. . . . S123

Subsequently, the anode electrode and the cathode electrode fabricated in S113 of Example 1 were cut into 2.5 cm squares, respectively, and these were pasted on both surfaces of the proton conducting membrane impregnated with the membrane-electrode junction agent produced in 5123, whereby a membrane-electrode assembly was obtained . . . . S124

The membrane-electrode assembly obtained in 5124 was heated at 80° C. for one hour by using an oven, thereafter, was pressed and cured at 120° C.-1 kN for three minutes by the press machine (made by Sintokogio, Ltd.) . . . S125

Example 4

S121 to S123 of Example 3 were similarly performed, the anode electrode and the cathode one fabricated in S113' were cut into 2.5 cm squares, respectively, and these were pasted one another, whereby a membrane-electrode assembly was fabricated. . . . S124'

Example 5

5-1. Fabrication of Gas Diffusion Layer

A gas diffusion layer was fabricated in a similar way to S111 of Example 1.

5-2. Production of Catalyst Ink 2.0 g of the poly(2-acrylamide-2-methylpropane sulfonic acid) (in which a 15% aqueous solution made by Sigma-Aldrich Corporation was diluted by water to 2.5%), 0.3 g of catalyst supported carbon (TEC61E54 made by Tanaka Kikinzoku Kogyo K. K.; Pt 23% Ru 30%), 0.6 g of the tetramethoxysilane, 0.5 g of the isopropyl alcohol, and 0.3 g of the PTFE dispersion (PTFE 30J, made by Du Pont-Mitsui Fluorochemicals Co. Ltd.) were mixed at the same time by using the ultrasonic homogenizer, whereby a catalyst ink was produced . . . . S112"

5-3. Fabrication of Electrode

The catalyst ink produced in S112" described above was used. Except for this, an electrode was fabricated in a similar way to S113 of Example 1. In the anode electrode, platinum amount was 0.5 mg/cm$^2$ and ruthenium amount was 0.3 mg/cm$^2$. Platinum amount in the cathode electrode was 0.5 mg/cm$^2$. . . . S113"

5-4. Fabrication of Membrane-Electrode Assembly

The electrode fabricated in S113" described above was used as an electrode. Except for this, an electrode was fabricated in a similar way to S114 of Example 1. . . . S114"

Example 6

S121 to 5123 of Example 3 were similarly performed, the anode electrode and the cathode one fabricated in S113" of Example 5 were cut into 2.5 cm squares, respectively, and these were pasted one another, whereby a membrane-electrode assembly was fabricated . . . . S124"

Comparative Example 1

1-1. Fabrication of Gas Diffusion Layer

A gas diffusion layer was fabricated in a similar way to S111 of Example 1.

1-2. Production of Catalyst Ink 0.3 g of the catalyst supported carbon (for the cathode, platinum supported carbon: TEC10E50E made by Tanaka Kikinzoku Kogyo K. K.; Pt 48%, for the anode, platinum-ruthenium supported carbon: TEC61E54 made by Tanaka Kikinzoku Kogyo K. K.; Pt 30% Ru 23%, were used), 1.0 g of water, 0.5 g of the isopropyl alcohol, and 2.0 g of a solution of commercially available ion-exchanged resin (Nafion perfluoro ion-exchanged resin, made by Sigma-Aldrich Corporation) were mixed by using the ultrasonic homogenizer, whereby a catalyst ink was produced . . . . S112–

1-3. Fabrication of Electrode

The catalyst ink produced in S112– described above was used. Except for this, an electrode was fabricated in a similar way to S113 of Example 1. In the anode electrode, platinum amount was 0.5 mg/cm$^2$ and ruthenium amount was 0.3 mg/cm$^2$. Platinum amount in the cathode electrode was 0.5 mg/cm$^2$. . . . S113–

1.4 Fabrication of Membrane-Electrode Assembly

The electrode fabricated in S113- described above was used as an electrode. Except for this, a membrane-electrode assembly was fabricated in a similar way to S114 of Example 1. . . . S114"

Comparative Example 2

S121 to S123 of Example 3 were similarly performed, the anode electrode and the cathode one fabricated in S113- of Comparative Example 1 were cut into 2.5 cm squares, respectively, and these were pasted one another, whereby a membrane-electrode assembly was fabricated . . . . S124"

Example 7

7-1. Fabrication of Proton Conducting Membrane 53.0 g of 3-mercaptopropyl trimethoxysilane (KBM-803, made by Shin-Etsu Chemical Co., Ltd.), 131.2 g of tetraethoxysilane (KBE-04, made by Shin-Etsu Chemical Co., Ltd.) and 26.5 g of the methanol were measured in the flask, and were stirred for 10 minutes at 0° C. To a mixture thus obtained, a solution obtained by mixing 15.6 g of 0.01 N hydrochloric acid and 20.8 g of the methanol with each other was added, followed by stirring for one hour at 0° C. A solution thus obtained was heated up to 40° C., followed by further stirring for two hours. Subsequently, a solution obtained by mixing 0.114 g of potassium fluoride (made by Wako Pure Chemical Industries, Ltd.) and 29.7 g of the methanol with each other was added to a resultant, and a mixed solution thus obtained was stirred for one hour at 40° C., and was heated up to 80° C., followed by further stirring for two hours. This mixed solution was cooled down to 0° C., and thereafter, alcohol was removed therefrom by the fractional distillation in vacuum at 40° C. A solution thus obtained was cooled down to 0° C., and 200 mL of diethyl ether was added thereto, followed by stirring for 10 minutes at 0° C., and thereafter, a resultant solution was filtered by using a membrane filter (Omnipore membrane, made by Nihon Millipore K. K.; pore diameter: 0.2 µm). The diethyl ether was removed from obtained filtrate by the fractional distillation in vacuum at 40° C., and a mercapto group-containing silane oligomer was obtained.

On a fluorine resin film, 3 g of the mercapto group-containing silane oligomer obtained was impregnated into a polyethylene-made porous material (average pore diameter: 0.5 µm; thickness: 50 µm; cut into a square with a side of 10 cm). Such a membrane obtained after the impregnation was covered with a fluorine resin film, and the applicator was allowed to level this resultant from the above so that a membrane thickness of the impregnated membrane could be 50 µm. The film was peeled off from the membrane, and the membrane was subjected to the UV irradiation, and was thereafter aged for 80 hours at the room temperature. The aged membrane was newly covered with fluorine resin films, and was sandwiched between two glass plates while interposing the fluorine resin films therebetween, and in this state, was put into the glass-made container together with 500 mL of water. After being heated/cured for 24 hours at 80° C. by using the gear oven, a resultant thus obtained was fired at 120° C. for eight hours, whereby a membrane was obtained. Thereafter, a membrane thus obtained was immersed into peracetic acid prepared by mixing 60 mL of acetic acid and 15 mL of 30% hydrogen peroxide water with each other, and was heated at 60° C. for one hour on the hot plate. A membrane thus obtained was taken out of the peracetic acid solution, and was immersed into water of 80° C. twice individually for one hour, whereby the peracetic acid solution was sufficiently removed therefrom. In such a way, a translucent proton conducting membrane was obtained . . . . S131

7-2. Fabrication of Gas Diffusion Layer (1) Fabrication of Electrode Base Material First of all, as for an electrode base material, a porous conductive sheet of 360 to 400 µm in thickness (TGP-H-120, made by Toray Industries, Inc.) was impregnated into the Neoflon ND-1 (made by Daikin Industries, Ltd.), and was heated at 300° C. for 30 minutes in air (water-repellent treatment) . . . . S133

(2) Fabrication of Conductive Intermediate Layer

Subsequently, carbon (Toka-8500, made by Tokai Cabon Co., Ltd.; specific surface area: 290 m²/g) as an inorganic conductive material, and Triton X-100 (made by Sanyo Trading Co.) of a surfactant and a deionized water were mixed in 7:13 mass ratio, and put into a Teflon (registered trademark) pot, further, zirconia balls were put thereto, and the resultant was ground. After being ground for 30 minutes, 1.1 g of the PTFE dispersion (PTFE 30J, made by Du Pont-Mitsui Fluorochemicals Co. Ltd.) was added to the resultant, followed by further grinding for 30 minutes. And, this carbon ground was coated on a water-repellent porous conductive sheet, after drying, the resultant was sandwiched between Teflon (registered trademark) sheets, followed by pressurizing. Furthermore, the resultant was immersed into isopropyl alcohol, after removing the Triton X-100, a hot-press was done at 130° C. for 10 seconds, and was heated at 300° C. for 10 minutes in air . . . . S134

A particle diameter of inorganic conductive particles contained in the intermediate layer was about 14 nm, a thickness of the intermediate layer was 20 to 50 µm, preferably, 20 to 30 µm. Note that, in the grinding process described above using zirconia balls, carbon aggregates were separated to some extent, while there was no change to an extent of altering its specific surface area.

7-3. Fabrication of Catalyst Layer

A liquid was produced by mixing 2.0 g of the poly(2-acrylamide-2-methylpropane sulfonic acid) (in which a 15% aqueous solution made by Sigma-Aldrich Corporation was diluted by water to 2.5%), 0.35 g of the tetramethoxysilane, 0.7 g of the PTFE dispersion (PTFE 30J, made by Du Pont-Mitsui Fluorochemicals Co. Ltd.) with one another . . . . S132

0.5 g of platinum supported carbon (TEC10E50E made by Tanaka Kikinzoku Kogyo K.K.; Pt 48%), 1.6 g of the isopropyl alcohol, 4.0 g of water and 3.0 g of a mixed solution produced in S132 were sufficiently mixed by using the ultrasonic homogenizer. The mixed catalyst solution was filtered by a conductive intermediate layer, and a catalyst layer of 40 µm in thickness was formed on the conductive intermediate layer. After drying, the resultant was hot-pressed at 130° C. for 10 seconds, whereby a cathode electrode was obtained . . . . S135

At this time, platinum amount was 0.5 mg/cm².

Subsequently, 0.5 g of platinum-ruthenium supported carbon (made by Tanaka Kikinzoku Kogyo K.K.; platinum supported amount: 30 wt %, ruthenium supported amount: 23 wt %), 1.6 g of the isopropyl alcohol, 4.0 g of water and 3.0 g of a junction agent produced in (2-1) was sufficiently mixed by the ultrasonic homogenizer. The mixed catalyst solution was filtered by a conductive intermediate layer, and a catalyst layer of 40 µm in thickness was formed on the conductive intermediate layer. After drying, the resultant was hot-pressed at 130° C. for 10 seconds, whereby an anode electrode was obtained. At this time, platinum amount was 0.5 mg/cm², ruthenium amount was 0.3 mg/cm². . . . S136

7-4. Fabrication of Membrane-Electrode Assembly

Using electrodes obtained in S135 and S136, a membrane-electrode assembly was fabricated.

After the membrane and the electrodes obtained as described above were sufficiently wetted with water, the electrode for the cathode was pasted on one surface of the membrane, and the electrode for the anode was pasted on another surface of the membrane. An assembly thus obtained was heated at 80° C. for one hour in the oven, thereafter, pressed at 120° C.-1 kN by using the press machine (made by Sintokogio, Ltd.), whereby a membrane-electrode assembly was obtained . . . S137

Example 8

8-1. Fabrication of Gas Diffusion Layer

A gas diffusion layer was fabricated in a similar way to S111 of Example 1.

8-2. Production of Catalyst Ink 2.0 g of the poly(2-acrylamide-2-methylpropane sulfonic acid) (in which a 15% aqueous solution made by Sigma-Aldrich Corporation was diluted by water to 2.5%), the poly (styrene sulfonic acid) (in which a 18% aqueous solution made by Sigma-Aldrich Corporation was diluted by water to 2.5%), 1.5 g of the catalyst supported carbon (for the cathode, platinum supported carbon: TEC10E50E made by Tanaka Kikinzoku Kogyo K.K.; Pt 48%, for the anode, platinum-ruthenium supported carbon: TEC61E54 made by Tanaka Kikinzoku Kogyo K.K.; Pt 30% Ru 23%, were used) were mixed. In the mixing, the ultrasonic homogenizer was used.

0.6 g of the tetramethoxysilane was added to the mixture described above, followed by mixing using the ultrasonic homogenizer. Furthermore, 3.0 g of the isopropyl alcohol was added to the resultant, followed by mixing using the ultrasonic homogenizer.

1.0 g of the PTFE dispersion (PTFE 30J, made by Du Pont-Mitsui Fluorochemicals Co. Ltd.) was added to the mixture described above, followed by mixing using the ultrasonic homogenizer, whereby a catalyst ink was produced . . . . S142

8-3. Fabrication of Electrode

Two gas diffusion layers were fabricated in S111 of Example 1, and catalyst inks produced in S142 for the anode and for the cathode were coated to diffusion layers thinly and uniformly, respectively. In the coating, a tool and a pallet were used. The resultants were pressed at 120° C.-1 kN for three minutes using a hot press machine (Precision press machine made by Sintokogio, Ltd.), whereby an anode electrode and a cathode electrode were fabricated. In the anode electrode, platinum amount was 0.5 mg/cm$^2$ and ruthenium amount was 0.3 mg/cm$^2$. Platinum amount in the cathode electrode was 0.5 mg/cm$^2$. . . . S143

8-4. Fabrication of Membrane-Electrode Assembly

The anode electrode and the cathode one fabricated in S143 were cut into 2.5 cm squares, respectively, and were joined to the Nafion 117 (made by Du Pont Corporation) as an electrolyte membrane, the resultant was defined as a membrane-electrode assembly. At this occasion, using the hot press machine described above, the membrane-electrode assembly was fabricated at 140° C.-1.5 kN for three minutes. . . . S144

Example 9

9-1. Fabrication of Diffusion Layer

A diffusion layer was fabricated in a similar way to S111 of Example 1.

9-2. Fabrication of Catalyst Layer 2.0 g of the Poly(2-acrylamide-2-methylpropane sulfonic acid) (in which a 15% aqueous solution made by Sigma-Aldrich Corporation was diluted by water to 2.5%) and 1.5 g of the catalyst supported carbon (for the cathode, platinum supported carbon: TEC10E50E made by Tanaka Kikinzoku Kogyo K.K.; Pt 48%, for the anode, platinum-ruthenium supported carbon: TEC61E54 made by Tanaka Kikinzoku Kogyo K.K.; Pt 30% Ru 23%, were used) were mixed. In the mixing, the ultrasonic homogenizer was used.

0.6 g of the tetramethoxysilane was added to the mixture described above, followed by mixing using the ultrasonic homogenizer. Furthermore, 3.0 g of the isopropyl alcohol was added to the resultant, followed by mixing using the ultrasonic homogenizer.

1.0 g of the PTFE dispersion (PTFE 30J, made by Du Pont-Mitsui Fluorochemicals Co. Ltd.) was added to the mixture described above, followed by mixing using the ultrasonic homogenizer, whereby a catalyst ink was produced . . . . S152

9-3. Fabrication of Electrode

An electrode was fabricated in a similar way to S113 of Example 1.

9-4. Fabrication of Membrane-Electrode Assembly

A membrane-electrode assembly was fabricated in a similar way to S114 of Example 1.

Example 10

10-1. Fabrication of Proton Conducting Membrane 0.12 g of water and 0.060 g of the triethylamine were dropped into a liquid obtained by mixing 4.07 g of the copolymer (X-41-1805, made by Shin-Etsu Chemical Co., Ltd.) of 3-mercaptopropyl trimethoxysilane and tetraethoxysilane and 1.0 g of the tetraethoxysilane (KBE-04, made by Shin-Etsu Chemical Co., Ltd.) with each other. A resultant solution was stirred at the room temperature for 20 minutes until becoming transparent, and was thereafter developed on a fluorine film. On this solution, a polyethylene-made porous material (average pore diameter: 0.5 μm; thickness: 50 μm; cut into a square with a side of 10 cm) was covered, and the porous material was impregnated with this liquid. The liquid was impregnated into the porous material by using a polyethylene-made pallet so as not to cause unevenness. Thereafter, such a membrane obtained after the impregnation was covered with a fluorine resin film, and the applicator was allowed to level this resultant from the above so that a membrane thickness of the impregnated porous material could be 50 μm.

The impregnated porous material was aged at the room temperature for eight hours while being left covered with the fluorine resin film, and thereafter, the fluorine resin film was peeled off therefrom, and the porous material was further aged for 16 hours. The aged membrane was sandwiched between fluorine resin films, these were further sandwiched between two glass plates, and in this state, these were put into the glass-made container together with 500 mL of water, and was heated and cured at 80° C. for 24 hours by using the gear oven. Thereafter, these were fired at 120° C. for eight hours. The fired membrane was moved to another glass-made container, and was immersed into a 1N hydrochloric acid solution and water individually for one hour under the condition of 80° C., whereby the unreacted matter and the catalyst were extracted from the membrane. After an extract was removed, the membrane was immersed into peracetic acid prepared by mixing 125 mL of acetic acid and 100 mL of 30% hydrogen peroxide water with each other, and was heated at 60° C. for one hour by the hot plate. The obtained membrane was taken out of the peracetic aid solution, and was immersed into water of 80° C. three times individually for one hour, whereby the peracetic acid solution was sufficiently removed therefrom. In such a way, a translucent membrane was obtained. This was defined as a proton conducting membrane . . . . S161

10-2. Production of Membrane-Electrode Junction Agent

A membrane-electrode junction agent was produced in a similar way to S122 of Example 3.

10-3. Fabrication of Membrane-Electrode Assembly

A membrane-electrode junction agent produced in S122 was sufficiently impregnated on both surfaces of the proton conducting membrane fabricated in S161.

Subsequently, the anode electrode and the cathode one fabricated in S113 of Example 1 were cut into 2.5 cm squares, respectively, and these were pasted on both surfaces of the proton conducting membrane impregnated with the membrane-electrode junction agent produced in S123, whereby a membrane-electrode assembly was obtained. . . . S174

The membrane-electrode assembly obtained in 5174 was heated at 80° C. for one hour in the oven, thereafter, was pressed and cured at 120° C.-1 kN for three minutes by the press machine (made by Sintokogio, Ltd.) . . . . S175

Example 11

A proton conducting membrane was similar to that in Example 10. An electrode was obtained in a similar way to Example 9, whereby a membrane-electrode assembly was obtained.

Example 12

1. Fabrication of Proton Conducting Membrane 53.0 g of the 3-mercaptopropyl trimethoxysilane (KBM-803, made by Shin-Etsu Chemical Co., Ltd.), 131.2 g of the tetraethoxysilane (KBE-04, made by Shin-Etsu Chemical Co., Ltd.) and 26.5 g of the methanol were measured in the flask, and were stirred for 10 minutes at 0° C. To a mixture thus obtained, a solution obtained by mixing 15.6 g of 0.01N hydrochloric acid and 20.8 g of the methanol with each other was added, followed by stirring for one hour at 0° C. A solution thus obtained was heated up to 40° C., followed by further stirring for two hours. Subsequently, a solution obtained by mixing 0.114 g of the potassium fluoride (made by Wako Pure Chemical Industries, Ltd.) and 29.7 g of the methanol with each other was added to a resultant, and a mixed solution thus obtained was stirred for one hour at 40° C., and was heated up to 80° C., followed by further stirring for two hours. The mixed solution was cooled down to 0° C., and thereafter, alcohol was removed therefrom by the fractional distillation in vacuum at 40° C. A solution thus obtained was cooled down to 0° C., and 200 mL of diethyl ether was added thereto, followed by stirring for 10 minutes at 0° C., and thereafter, a resultant solution was filtered by using the membrane filter (Omnipore membrane, made by Nihon Millipore K. K.; pore diameter: 0.2 μm). The diethyl ether was removed from obtained filtrate by the fractional distillation in vacuum at 40° C., and a mercapto group-containing silane oligomer was obtained.

0.11 g of water and 0.05 g of triethylamine (made by Wako Pure Chemical Industries, Ltd.) were dropped into a liquid obtained by mixing 1.86 g of the obtained mercapto group-containing silane oligomer and 0.62 g of triethoxyvinylsilane (KBE-1003, made by Shin-Etsu Chemical Co., Ltd.) and 3.51 g of the tetraethoxysilane (KBE-04, made by Shin-Etsu Chemical Co., Ltd.) with one another. After a mixed solution thus obtained was stirred for 10 minutes at the room temperature, 12.5 g of a 30% aqueous solution of 2-acrylamide-2-methylpropane sulfonic acid (made by Sigma-Aldrich Corporation), 0.3 g of 1,4-divinylbenzene (made by Wako Pure Chemical Industries, Ltd.), and 1.0 g of a 10% aqueous solution of N,N'-methylene-bis-acrylamide (made by Wako Pure Chemical Industries, Ltd.) were dropped thereinto. A mixed solution thus obtained was cooled down to 0° C., followed by stirring for five minutes. 0.1 g of a photopolymerization initiator (KR-02, made by Light Chemical Industries Co., Ltd.) and 0.1 g of azobis(isobutyronitrile) (made by Wako Pure Chemical Industries, Ltd.) as a thermal polymerization initiator were added to the mixed solution, whereby a polymerizable composition was obtained.

On a fluorine resin film, 3 g of the obtained polymerizable composition was impregnated into a polyethylene-made porous material (average pore diameter: 0.5 μm; thickness: 50 μm; cut into a square with a side of 10 cm). Such a membrane obtained after the impregnation was covered with a fluorine resin film, and the applicator was allowed to level this resultant from the above so that a membrane thickness of impregnated membrane could be 50 μm. The film was peeled off from the membrane, and the membrane was subjected to the UV irradiation, and was thereafter aged for 80 hours at the room temperature. The aged membrane was newly covered with fluorine resin films, and was sandwiched between two glass plates while interposing the fluorine resin films therebetween, and in this state, was put into the glass-made container together with 500 mL of water. After being heated/cured for 24 hours at 80° C. by using the gear oven, followed by firing at 120° C. for eight hours, whereby a membrane was obtained. Thereafter, the obtained membrane was subjected to the same washing and oxidation processes as those in Example 10, whereby a translucent proton conducting membrane was obtained.

Thereafter, a membrane-electrode assembly was obtained in a similar way to Example 10.

Example 13

A proton conducting membrane was fabricated in a similar way to Example 12. An electrode was fabricated in a similar way to Example 9, and a membrane-electrode assembly was obtained.

<Evaluation Method>
(1) Relative Maximum Output (Examples 1 to 6, Comparative Examples 1 and 2 Concerned)

Each of the membrane-electrode assemblies was set into a single cell (JARI standard cell) for the fuel cell in accordance with a determined method. This cell was set into a fuel cell power generation evaluation apparatus ("As-510", made by NF Corporation). Then, the cell was operated under conditions where a cell temperature was 60° C., a concentration of methanol was 1 mol %, a flow rate thereof was 1 cc per minute, and a flow rate of the air was 100 cc per minute. Then, currents (I) and voltages (V) of the respective cells were measured, and the maximum outputs thereof were compared with one another.

As an evaluation criterion for comparing the power generation performances of the MEAs fabricated in the examples and the comparative ones, the maximum output in Comparative Example 1 was defined as 100, and the relative values in the examples and the comparative ones with respect to this maximum output were evaluated as the evaluation criterion.

<Result>
Results are shown in Table 1.

TABLE 1

|  | MAXIMUM OUTPUT (RELATIVE VALUE) |
|---|---|
| EXAMPLE 1 | 110 |
| EXAMPLE 2 | 113 |

TABLE 1-continued

|  | MAXIMUM OUTPUT (RELATIVE VALUE) |
| --- | --- |
| EXAMPLE 3 | 118 |
| EXAMPLE 4 | 120 |
| EXAMPLE 5 | 107 |
| EXAMPLE 6 | 115 |
| COMPARATIVE EXAMPLE 1 | 100 |
| COMPARATIVE EXAMPLE 2 | 110 |

The maximum output in Example 1 or Example 3 was shown to be higher than that in Comparative Example 1 or Comparative Example 2, respectively, so the electrode of the present invention was shown to be superior to Nafion electrode in the power generation performance. Moreover, the maximum output in Example 2 or Example 0.4 was shown to be higher than that in Example 1 or Example 3, respectively, so in catalyst ink production, by selecting a polymer material containing an acid group, the electrode performance was shown to be improved. Furthermore, the maximum output in Example 1 or Example 3 was shown to be higher than that in Example 5 or Example 6, respectively, so by the mixing procedure of materials in the electrode fabrication, the performance of the electrode was shown to be improved.

(2) Initial Power Generation Performance Evaluation (Examples 7 to 13 Concerned)

For the membrane-electrode assemblies fabricated in Examples 7 to 13 set an aqueous solution of methanol as the anode side and air as the cathode side, an evaluation of power generation performance was performed.

First, each of the membrane-electrode assemblies was set into the single cell (JARI standard cell) for the fuel cell in accordance with the prescribed method. This cell was set into the fuel cell power generation evaluation apparatus ("As-510", made by NF Corporation). Then, the cell was operated under conditions where a cell temperature was 60° C., a concentration of methanol was 1 mol %, a flow rate thereof was 1 cc per minute, and a flow rate of the air was 100 cc per minute. Then, currents (I) and voltages (V) of the respective cells were measured, and the maximum outputs thereof were compared with one another.

The case where the performance of each example is equivalent to that of Example 9 is represented by a single circle, the case where each example is superior to Example 9 is represented by a double circle, and the case where each example is inferior to Example 9 is represented by a cross.

<Result>

The results obtained are shown together in Table 2.

TABLE 2

|  | INITIAL POWER GENERATION PERFORMANCE |
| --- | --- |
| EXAMPLE 7 | ⊚ |
| EXAMPLE 8 | ⊚ |
| EXAMPLE 9 | ○ |
| EXAMPLE 10 | ⊚ |
| EXAMPLE 11 | ○ |
| EXAMPLE 12 | ⊚ |
| EXAMPLE 13 | ○ |

Examples 8, 9 and 12, in comparison with Examples 7, 9, 11 and 13, were found to be improved in initial power generation performances.

Note that, as for Example 7, as a comparison, initial power generation performance evaluation of the one, in which the Nafion 117 (made by Du Pont Corporation) was used as a proton conducting membrane and was humidified sufficiently, and that of the one, in which gas diffusion electrodes pressed at 120° C.-1 kN for three minutes by the press machine (made by Sintokogio, Ltd.) were used, were performed, whereby the membrane-electrode assembly in Example 7 was found to be superior to those in maximum output.

The invention claimed is:

1. An electrode comprising:
a catalyst layer formed of a catalyst ink having an electrode binder; and
an electron conductive material supported with a catalyst;
wherein the electrode binder is configured to form a catalyst layer in the electrode having catalyst layers arranged on both surfaces of an electrolyte membrane; and
wherein the electrode binder comprises:
a cross-linked compound (X) having a silicon-oxygen bond;
a polymer material (Y) containing an acid group; and
an aqueous dispersion (Z) containing a thermoplastic resin.

2. A membrane-electrode assembly comprising:
an electrolyte membrane; and
a first electrode and a second electrode arranged on both surfaces of the electrolyte membrane, wherein the first electrode and second electrode are electrodes according to claim 1.

3. The membrane-electrode assembly according to claim 2, wherein the electrolyte membrane is an electrolyte membrane comprising: an acid group-containing structure (H); and a silicon-oxygen bonding structure (A) containing a cross-linked structure by a silicon-oxygen bond, and the silicon-oxygen bonding structure (A) is a structure represented by a following general formula I:

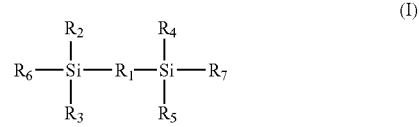

(wherein $R_1$ is a chain hydrocarbon group containable a substituent with a carbon number of 1 to 50 and/or a heteroatom, or is an oxygen atom, $R_2$, $R_3$, $R_4$, $R_5$, $R_6$ and $R_7$ are any of hydrogen atoms, methyl groups, ethyl groups, propyl groups, butyl groups, phenyl groups, methoxy groups, ethoxy groups, propoxy groups, butoxy groups, hydroxyl groups and O—Si—, and may be the same or different from one another, at least one of $R_1$ to $R_7$ contains an oxygen atom, at least one of $R_2$, $R_3$ and $R_6$ is O—Si that is involved in the cross-link, and at least one of $R_4$, $R_5$ and $R_7$ is O—Si that is involved in the cross-link.)

4. The membrane-electrode assembly according to claim 2, wherein the electrolyte membrane is an electrolyte membrane comprising a silicon-oxygen bonding structure (A) containing a cross-linked structure that is cross-linked by a silicon-oxygen bond and an acid group-containing structure (B) covalently bonded to a silane compound and having an acid group, being coupled to each other by a silicon-oxygen bond, wherein the silicon-oxygen bonding structure (A) is a structure represented by a following general formula I:

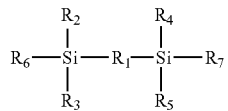 (I)

(wherein $R_1$ is a chain hydrocarbon group containable a substituent with a carbon number of 1 to 50 and/or a heteroatom, or is an oxygen atom, $R_2$, $R_3$, $R_4$, $R_5$, $R_6$ and $R_7$ are any of hydrogen atoms, methyl groups, ethyl groups, propyl groups, butyl groups, phenyl groups, methoxy groups, ethoxy groups, propoxy groups, butoxy groups, hydroxyl groups and O—Si—, and may be the same or different from one another, at least one of $R_1$ to $R_7$ contains an oxygen atom, at least one of $R_2$, $R_3$ and $R_6$ is O—Si that is involved in the cross-link, and at least one of $R_4$, $R_5$ and $R_7$ is O—Si that is involved in the cross-link.)

5. The membrane-electrode assembly according to claim 4, wherein a structure in which a silane compound (α) having a polymerizable unsaturated double bond and an acid group-containing compound (β) having an acid group and a polymerizable unsaturated double bond are covalently bonded to each other is contained in the acid group-containing structure (B).

6. A polymer electrolyte fuel cell comprising the membrane-electrode assembly according claim 5.

7. A polymer electrolyte fuel cell comprising:
a unit cell made of the membrane-electrode assembly according to claim 5; and
a pair of separators which serve as passages of fuel and air, being arranged on outsides of the unit cell
wherein a plurality of the unit cells adjacent to one another are coupled to one another.

8. The electrode according to claim 1, wherein the polymer material (Y) comprises:
a polymer material (Y1) containing an acid group with an weight-average molecular weight of 1,000 to 300,000; and
a polymer material (Y2) containing an acid group with an weight-average molecular weight of 300,000 to 10,000,000.

9. The electrode according to claim 8, wherein the weight-average molecular weight of the polymer material (Y1) is 5,000 to 100,000, and the weight-average molecular weight of the polymer material (Y2) is 500,000 to 5,000,000.

10. The electrode according to claim 1, wherein the polymer material (Y) is a composite of a monomer (V) containing an acid group and a monomer (W) not containing an acid group and containing silicon.

11. The electrode according to claim 10, wherein a molar ratio of the monomer (V) containing an acid group to the monomer (W) not containing an acid group and containing silicon (V:W) is 99:1 to 50:50.

12. The electrode according to claim 1, wherein the polymer material (Y) comprising an acid group-containing polymer is obtained by polymerizing a monomer having a polymerizable unsaturated double bond.

13. The electrode according to claim 1, wherein the aqueous dispersion (Z) is a fluorine resin dispersion.

* * * * *